(12) United States Patent
Okada et al.

(10) Patent No.: US 12,162,086 B2
(45) Date of Patent: Dec. 10, 2024

(54) WELDED JOINT MANUFACTURING METHOD, WELDED JOINT, TEMPERING DEVICE, AND WELDING APPARATUS

(71) Applicant: NIPPON STEEL CORPORATION, Tokyo (JP)

(72) Inventors: Tohru Okada, Tokyo (JP); Hiroki Fujimoto, Tokyo (JP); Masanori Yasuyama, Tokyo (JP); Yoshiaki Nakazawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 565 days.

(21) Appl. No.: 17/437,434

(22) PCT Filed: Mar. 16, 2020

(86) PCT No.: PCT/JP2020/011563
§ 371 (c)(1),
(2) Date: Sep. 9, 2021

(87) PCT Pub. No.: WO2020/184728
PCT Pub. Date: Sep. 17, 2020

(65) Prior Publication Data
US 2022/0168839 A1    Jun. 2, 2022

(30) Foreign Application Priority Data
Mar. 14, 2019    (JP) .................................. 2019-047020

(51) Int. Cl.
*B23K 11/11*    (2006.01)
*B23K 11/30*    (2006.01)
(Continued)

(52) U.S. Cl.
CPC .............. *B23K 11/115* (2013.01); *B23K 11/30* (2013.01); *B23K 11/36* (2013.01); *B23K 2103/04* (2018.08)

(58) Field of Classification Search
CPC ... B23K 11/0013; B23K 11/115; B23K 11/30; B23K 11/36; B23K 2103/04; B23K 11/16; Y02P 10/25; C22B 9/16
(Continued)

(56) References Cited

U.S. PATENT DOCUMENTS

2011/0303655 A1    12/2011    Kanai et al.
2013/0180961 A1*    7/2013    Goto ...................... B23K 11/36
                                                                    219/86.33
(Continued)

FOREIGN PATENT DOCUMENTS

CN    105339123 A    2/2016
EP    3015215 A1    5/2016
(Continued)

*Primary Examiner* — Dana Ross
*Assistant Examiner* — James F Sims, III
(74) *Attorney, Agent, or Firm* — SOLARIS Intellectual Property Group, PLLC

(57) ABSTRACT

A welded joint manufacturing method includes: abutting a first electrode against a first steel sheet of a welded joint at a site A, which is a location at an outer side of a nugget in a sheet-plane direction in a plane running parallel to the first steel sheet; abutting a second electrode against a second steel sheet at a site B, which is a location at an outer side of the nugget in a sheet-plane direction in a plane running parallel to the first steel sheet of the welded joint, and positioned on an opposite side of the nugget from the site A; and passing a current through the welded joint between the first electrode and the second electrode.

12 Claims, 12 Drawing Sheets

(51) Int. Cl.
*B23K 11/36* (2006.01)
*B23K 103/04* (2006.01)

(58) Field of Classification Search
USPC ............................... 219/91.2; 148/526, 566
See application file for complete search history.

(56) References Cited

U.S. PATENT DOCUMENTS

| | | |
|---|---|---|
| 2015/0217396 A1 | 8/2015 | Okada et al. |
| 2016/0368080 A1 | 12/2016 | Hatta et al. |
| 2018/0104761 A1 | 4/2018 | Horino et al. |
| 2018/0243853 A1 | 8/2018 | Yoshinaga et al. |
| 2019/0001429 A1 | 1/2019 | Sawanishi et al. |
| 2019/0201999 A1 | 7/2019 | Takashima et al. |
| 2021/0362266 A1* | 11/2021 | Endo ................. C21D 6/004 |
| 2023/0175092 A1* | 6/2023 | Pörzgen ................ C21D 9/48 |
| | | 148/318 |

FOREIGN PATENT DOCUMENTS

| | | |
|---|---|---|
| EP | 3015215 B1 | 8/2018 |
| JP | S60-141378 A | 7/1985 |
| JP | 2012-055941 A | 3/2012 |
| JP | 2012-066284 A | 4/2012 |
| JP | 2013-022623 A | 2/2013 |
| JP | 2014-083586 A | 5/2014 |
| JP | 5714537 B2 | 5/2015 |
| JP | 2016-055329 A | 4/2016 |
| JP | 2016-068095 A | 5/2016 |
| JP | 2017-013078 A | 1/2017 |
| JP | 2017-047476 A | 3/2017 |
| JP | 2017-131916 A | 8/2017 |
| WO | 2010/038779 A1 | 4/2010 |
| WO | 2018/038045 A1 | 3/2018 |

* cited by examiner

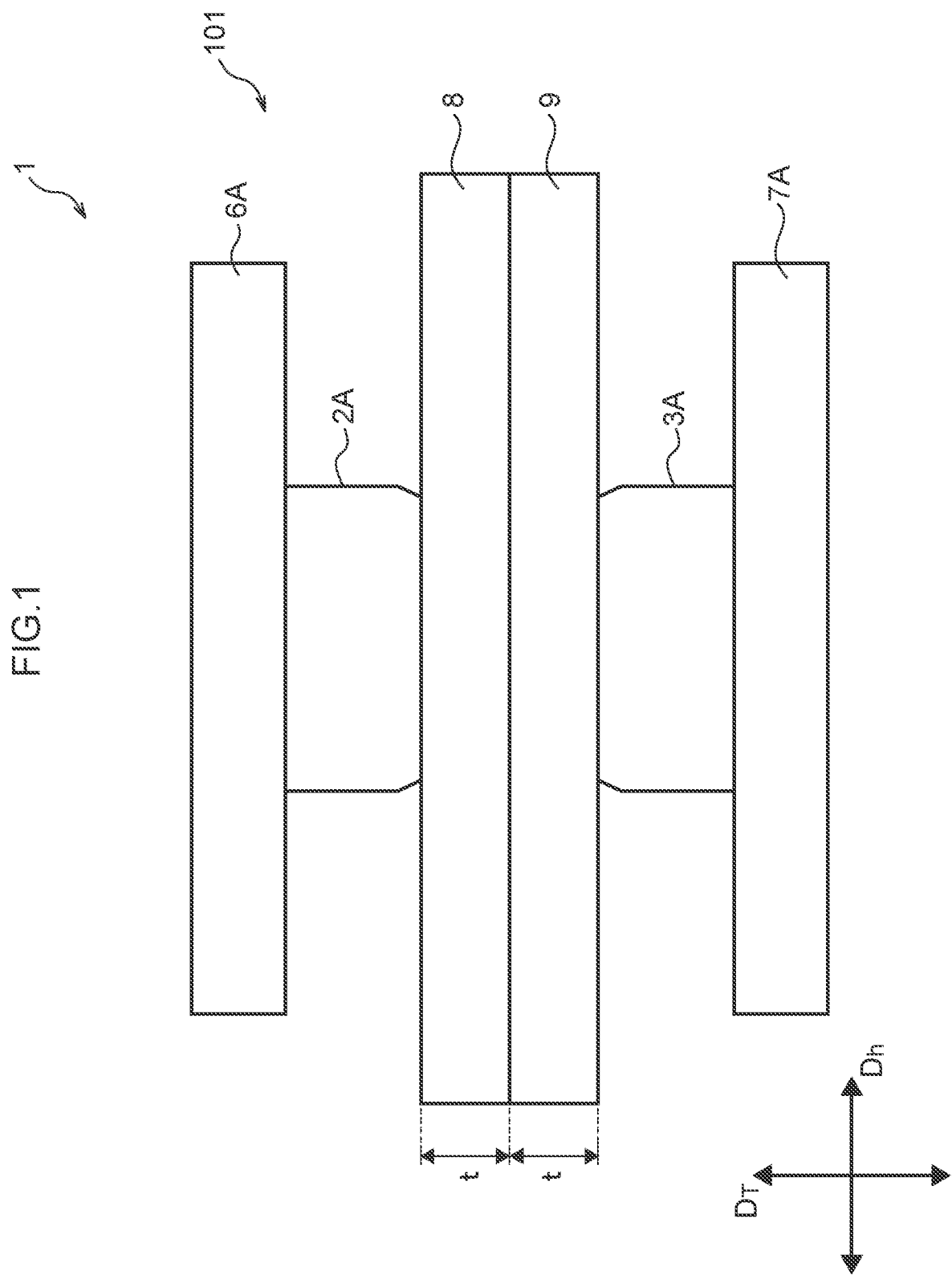

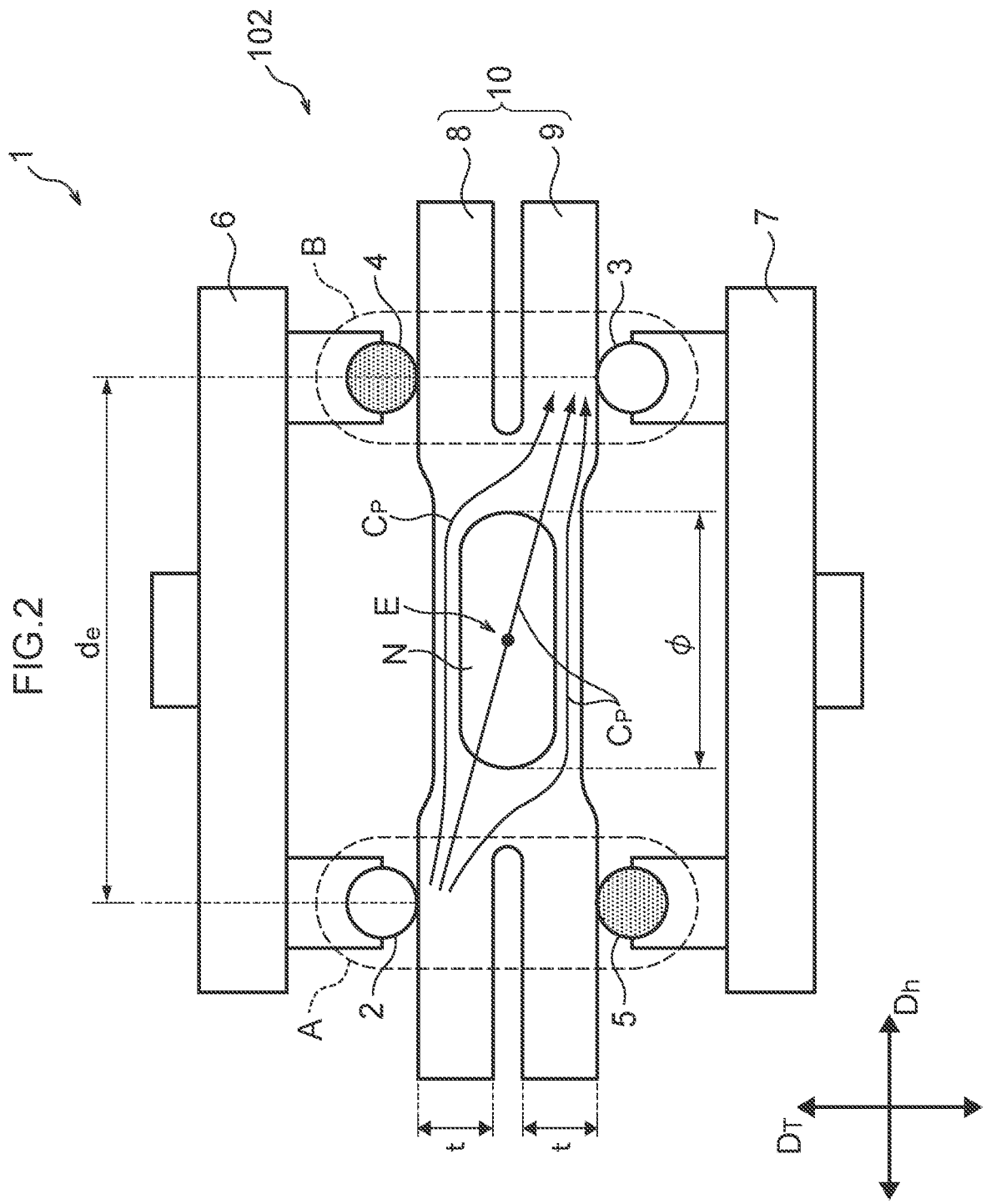

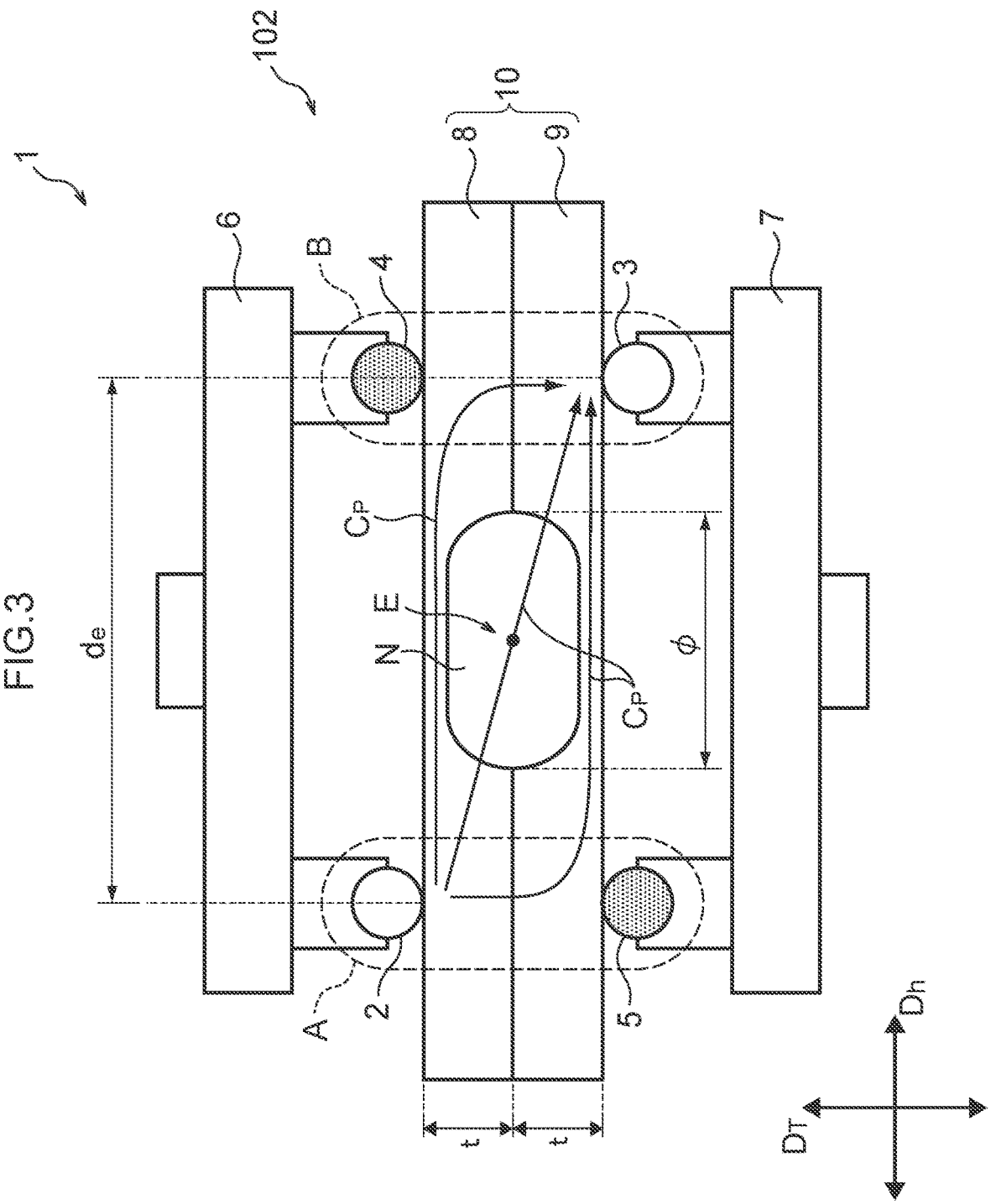

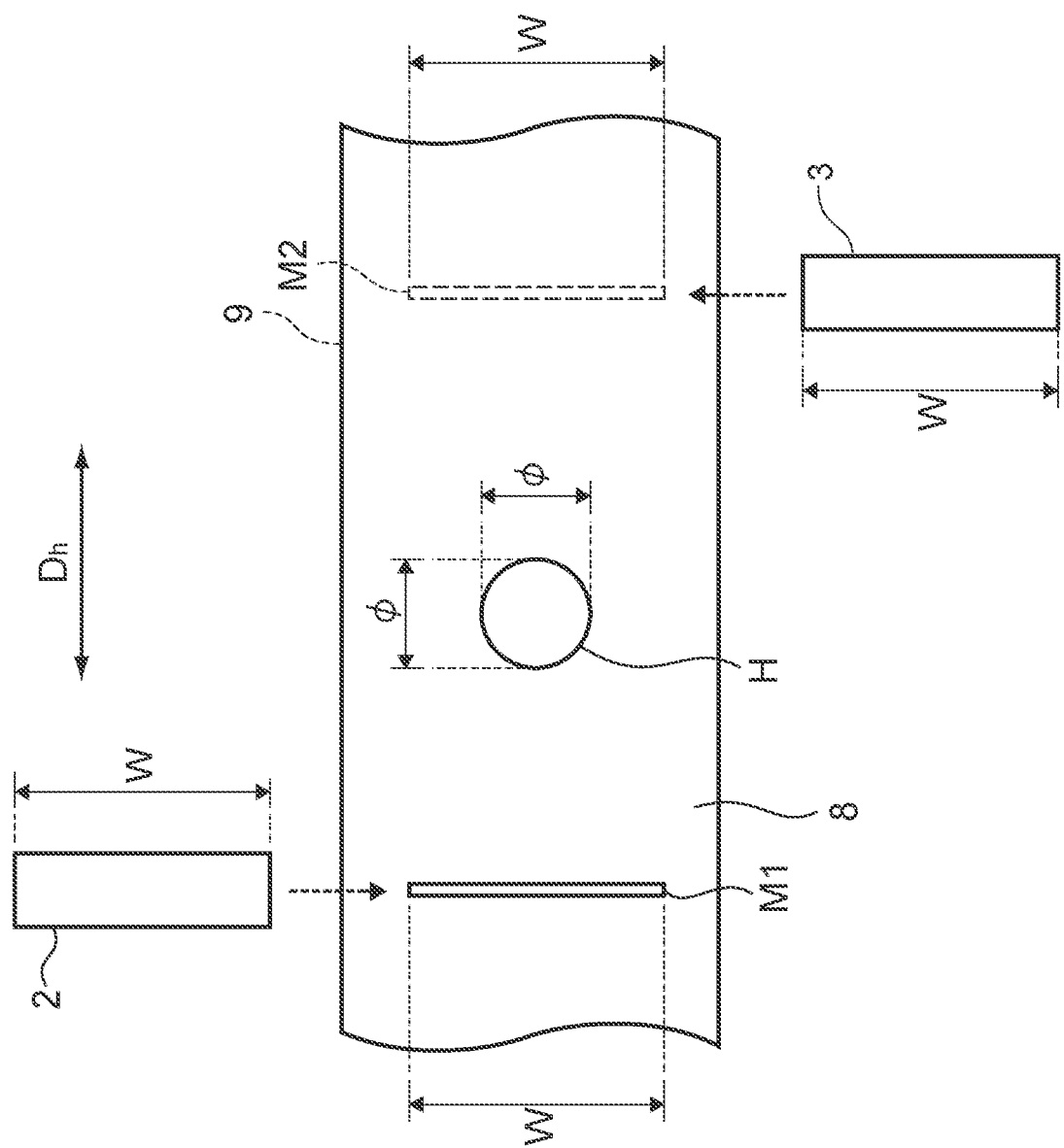

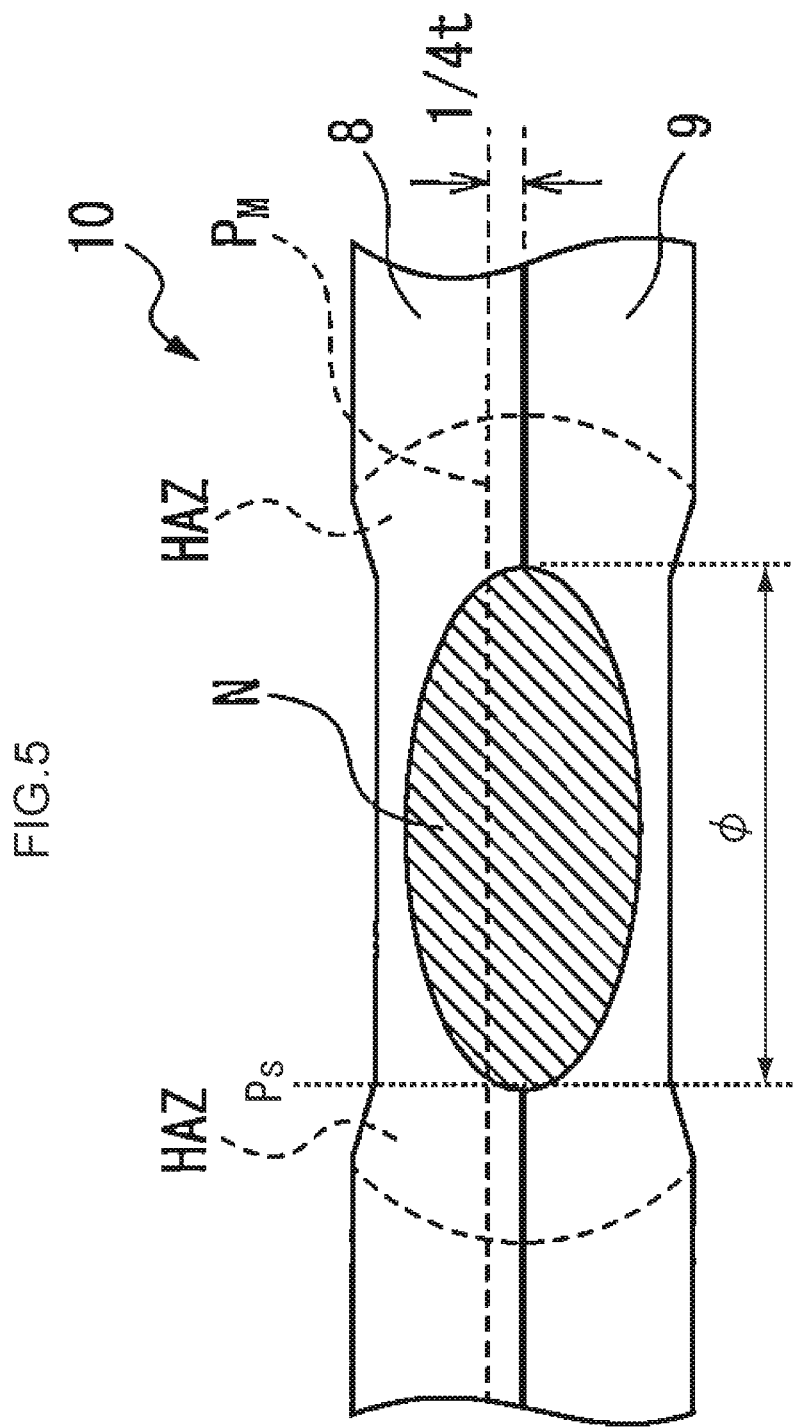

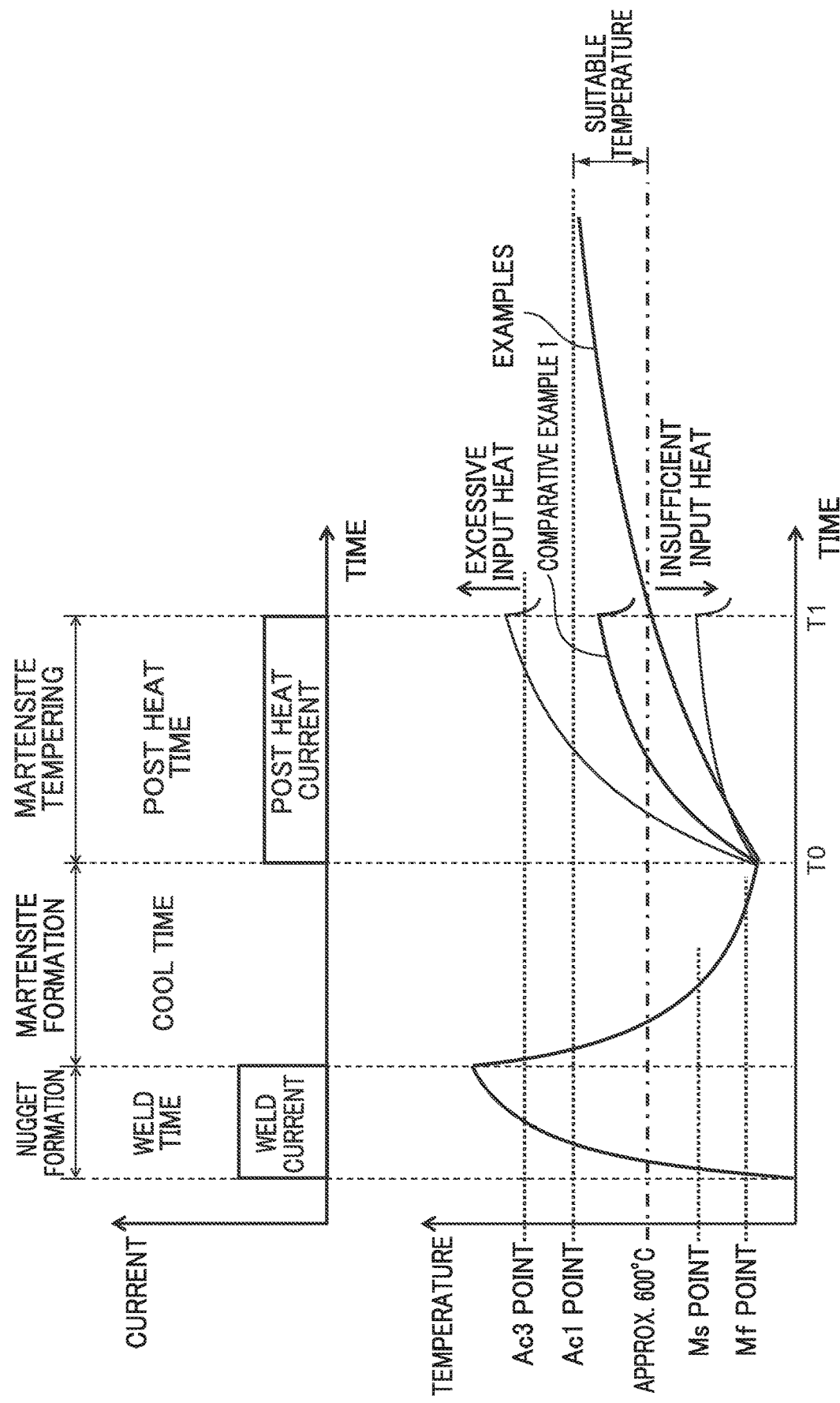

WELDED JOINT MANUFACTURING METHOD, WELDED JOINT, TEMPERING DEVICE, AND WELDING APPARATUS

TECHNICAL FIELD

The present disclosure relates to a welded joint manufacturing method, a welded joint, a tempering device, and a welding apparatus.

BACKGROUND ART

For example, when high-strength sheet steels are spot welded, insufficient joint strength may cause welds to fracture, such that members fail to perform as designed. Examples of high-strength sheet steels include sheet steel with a comparatively high carbon (C) content and tensile strength of 440 MPa or greater.

Various methods, such as post heat methods and two-stage energization methods are being investigated as joining processes for modifying weld properties. For example, Japanese Patent No. 5714537 (Patent Document 1) discloses technology for spot welding two or more overlapped high-strength steel sheets, in which welding is followed by an appropriate rest period before performing post heat for a short time. In Patent Document 1, the properties of a nugget region and a heat affected zone are modified by a tempering effect and an effect of slowing the rate of cooling (what is referred to as an auto-tempering effect), thereby enabling the joint strength to be improved. Note that a nugget or nugget region is a region where metal has melted.

SUMMARY OF INVENTION

Technical Problem

However, in post heat methods or in two-stage energization methods such as that proposed in Patent Document 1, the range of conditions under which the desired effects can be obtained are narrow, and are liable to be affected by various external factors encountered at an actual manufacturing site. Application of such approaches at an actual manufacturing site therefore remains difficult. Hereafter, the quality of maintaining stable behavior under various external factors encountered at a manufacturing site is referred to as having high robustness, whereas conversely, being unable to maintain stable behavior is referred to as having low robustness.

Namely, many conventional post heat methods and two-stage energization methods are often methods in which energization is performed at least twice during a single cycle from when a sheet grouping is applied with pressure by a pair of electrodes until the electrodes are retracted after welding, as a technique for tempering the weld (nugget). However, with such methods, suitable ranges of conditions (temperature conditions and the like) in which the desired effects can be obtained are narrow. Moreover, at actual manufacturing sites, various external factors including debris, electrode wear, electrode core misalignment, and inter-steel sheet gaps may be encountered.

Since the current density during post heat varies due to the influence of such external factors, various issues exist, such as a tendency for uneven current density and difficulties in controlling the current density. Out of the various conditions that enable the desired effects to be obtained, the current passing through a weld being liable to stray from its suitable range in particular reduces robustness, making application of post heat methods and two-stage energization methods such as that in Patent Document 1 to actual manufacturing sites difficult. As a specific example, productivity of manufactured components suffers. There is accordingly a risk that the desired modified properties (tempering effect) in spot welded joints may be difficult to obtain.

An object of the present disclosure is to provide a welded joint manufacturing method, a welded joint, a tempering device, and a welding apparatus for a welded joint with excellent robustness that is not liable to be affected by external factors during a post heat process.

Solution to Problem

Specific aspects of the present disclosure are as follows.

A welded joint manufacturing method according to the present disclosure includes: preparing a welded joint including a first steel sheet, a second steel sheet overlapped with the first steel sheet, and a quenched nugget joining the first steel sheet and the second steel sheet together; abutting a first electrode against the first steel sheet at a site A, which is a location at an outer side of the nugget in a sheet-plane direction in a plane running parallel to the first steel sheet of the welded joint; abutting a second electrode against the second steel sheet at a site B, which is a location at an outer side of the nugget in a sheet-plane direction in a plane running parallel to the first steel sheet of the welded joint, and positioned on an opposite side of the nugget from the site A; and passing a current through the welded joint between the first electrode and the second electrode.

A tempering device according to the present disclosure includes a first electrode, and a second electrode. Approach and retract directions of the first electrode and approach and retract directions of the second electrode are mutually opposing directions to each other. An inter-electrode distance between the first electrode and the second electrode is at least 6 mm in a flat plane orthogonal to the approach and retract directions.

A welding apparatus according to the present disclosure includes the tempering device according to the present disclosure, a robot arm to which the tempering device is attached, a welding machine configured to form a nugget, and a position controller. The position controller is configured to control the robot arm so as to move an intermediate point between a tip of the first electrode and a tip of the second electrode to a location that has been welded as the nugget by the welding machine, and to dispose the first electrode and the second electrode at an outer side of the location that has been welded.

A welded joint according to the present disclosure includes a first steel sheet, a second steel sheet overlapped with the first steel sheet, and a quenched nugget joining the first steel sheet and the second steel sheet together. Tensile strength of the first steel sheet and the second steel sheet is at least 1180 MPa. A contact mark from a first electrode is formed on the first steel sheet at a site A, which is a location at an outer side of the nugget in a sheet-plane direction in a plane running parallel to the first steel sheet of the welded joint. A contact mark from a second electrode is formed on the second steel sheet at a site B, which is a location at an outer side of the nugget in a sheet-plane direction in a plane running parallel to the first steel sheet of the welded joint, and positioned on an opposite side of the nugget from the site A. A softened structure having Vickers hardness lower than Vickers hardness of the first steel sheet and Vickers hardness of the second steel sheet by at least 10 HV is continuously present between the contact mark from the first electrode and the contact mark from the second electrode.

Advantageous Effects of Invention

The present disclosure is able to provide a welded joint manufacturing method, a welded joint, a tempering device, and a welding apparatus for a welded joint with excellent robustness that is not liable to be affected by external factors during a post heat process.

BRIEF DESCRIPTION OF DRAWINGS

FIG. 1 is a cross-section illustrating the periphery of electrodes of a welding machine employed to form a nugget as employed in a tempering process of a welded joint manufacturing method according to an exemplary embodiment of the present disclosure.

FIG. 2 is a cross-section illustrating the periphery of electrodes of a tempering device included in a spot welding apparatus as employed in a tempering process of a welded joint manufacturing method according to an exemplary embodiment of the present disclosure.

FIG. 3 is a cross-section illustrating the periphery of electrodes of a tempering device included in another example of a spot welding apparatus as employed in a tempering process of a welded joint manufacturing method according to an exemplary embodiment of the present disclosure.

FIG. 4 is a plan view illustrating a welded joint according to an exemplary embodiment of the present disclosure.

FIG. 5 is a cross-section illustrating measurement positions for hardness distribution in a welded joint.

FIG. 7 is a graph to explain a relationship between heating duration and temperature with respect to a welded joint during a tempering process of a welded joint manufacturing method according to an exemplary embodiment of the present disclosure.

DESCRIPTION OF EMBODIMENTS

Figure 6A:
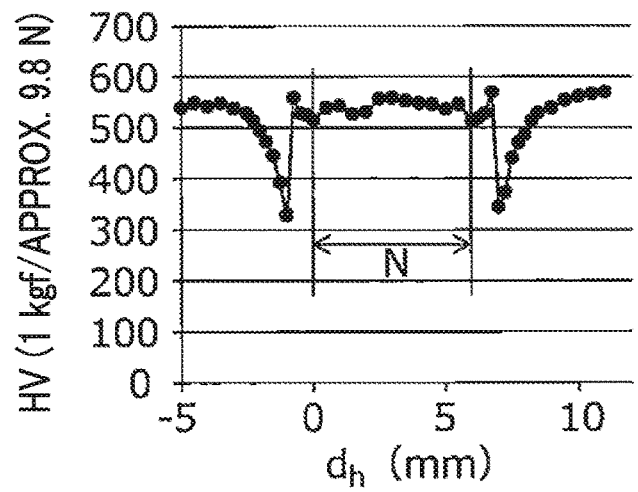
FIG. 6A is a diagram illustrating a hardness distribution in a welded joint subjected to a conventional tempering process.

Detailed explanation follows regarding a favorable exemplary embodiment of a welded joint manufacturing method of the present disclosure, with reference to the drawings. A welded joint of the present disclosure is also referred to as a "spot welded joint". In the drawings, portions that are the same or similar to one another are allocated the same or similar reference numerals. Note that the relationships between thickness and plan view dimensions, as well as thickness proportions and the like in the various devices and various members in the drawings may differ from those in reality. Accordingly, specific thicknesses and dimensions should be ascertained with reference to the forthcoming explanation. Moreover, dimensional relationships and proportions may also differ between the respective drawings.

<Spot Welded joint Manufacturing Method>

A spot welded joint manufacturing method of the present disclosure is a manufacturing method including a welding process of post-heating plural mutually overlapped steel sheets to form a nugget, a cooling process of cooling at least the nugget, and a tempering process of post-heating the plural steel sheets in an oblique direction relative to a sheet thickness direction of the steel sheets in order to temper at least the nugget.

Note that in the present specification, an "oblique direction relative to a sheet thickness direction" is also referred to simply as an "oblique direction".

In the manufacturing method of the present disclosure, during a post heat process, this being a tempering process separate to the welding process to form the nugget, the nugget is tempered by post-heating the plural steel sheets in an oblique direction. In other words, when tempering the nugget, a pair of electrodes are disposed at an outer side of the nugget and the length of an energization path is increased such that the pair of electrodes on either side of the plural steel sheets do not overlap in a sheet thickness direction. As a result, a broad region including not only the nugget but also a heat affected zone (HAZ) peripheral to the nugget is gently heated, enabling tempering to occur. So doing enables a broad range of suitable current conditions to be secured in which a tempering effect (namely, an effect of improving toughness) can be obtained.

The manufacturing method of the present disclosure is thus capable of securing excellent robustness and is not liable to be affected by external factors during the post heat process.

Detailed explanation follows regarding each process of the manufacturing method of the present disclosure, with reference to the drawings. In the present disclosure, a welding apparatus is referred to as a "spot welding apparatus". As illustrated in FIG. 1, a spot welding apparatus 1 serving as a welding apparatus includes a welding machine 101 used to form the nugget in the welding process. Moreover, as illustrated in FIG. 2, the spot welding apparatus 1 serving as a welding apparatus also includes a tempering device 102 used to temper a formed nugget N during the tempering process. Note that the tempering device 102 may be a separate device independent of the spot welding apparatus 1. Explanation follows regarding each of these processes.

[Welding Process]

The welding process of the present disclosure is a process of post-heating plural overlapped steel sheets to form a nugget.

The welding process may employ a similar process to a process performed during normal spot welding, as long as a nugget can be formed at mutually superimposed faces of the plural overlapped steel sheets and in a region in the vicinity of these mutually superimposed faces. An example of such a process is a process in which the plural overlapped steel sheets are interposed between a pair of electrodes, and then applied with a pressurizing force while being energized in a sheet thickness direction with a predetermined weld current for a predetermined weld time, in order to melt the mutually superimposed faces of the plural steel sheets and the region in the vicinity of these mutually superimposed faces and thereby form a nugget.

FIG. 1 illustrates an example in which a sheet grouping configured by overlapping an upper sheet 8 with a lower sheet 9 has been disposed inside the welding machine 101 in order to form a nugget. The upper sheet 8 of the sheet grouping is contacted by an upper electrode 2A provided to an upper holder member 6A. The lower sheet 9 of the sheet grouping is contacted by a lower electrode 3A provided to a lower holder member 7A. Note that in this explanation, "upper" and "lower" are used to refer to the upper and lower sides as they appear in the drawings, and are not used to indicate positional relationships in a vertical direction in practice. Similarly, in this explanation, "left" and "right" are used to refer to the left and right as they appear in the drawings, and are not used to indicate positional relationships in a horizontal direction in practice. This applies throughout the explanation.

The upper electrode 2A and the lower electrode 3A each have a substantially circular cylinder shape, and have substantially the same dimensions as each other. Tips of the upper electrode 2A and the lower electrode 3A on the sheet grouping side have a reduced diameter, and outer edges of the tips as viewed along the sheet thickness direction are substantially circular in shape. In the welding process, the nugget is internally formed in the sheet grouping between the upper electrode 2A and the lower electrode 3A.

Note that predetermined weld conditions corresponding to a desired nugget diameter or the like may be employed as weld conditions during the welding process. Weld conditions may include a weld current, a weld time, and a pressurizing force to be applied by the electrodes.

A pair of electrodes such as those employed in normal spot welding may be employed as the pair of electrodes employed in the welding process, as long as they are capable of forming a nugget of a predetermined size at the mutually superimposed faces of the plural steel sheets and in a region in the vicinity of these mutually superimposed faces.

[Cooling Process]

The cooling process of the present disclosure is a process of cooling at least the nugget formed during the welding process described above.

The cooling process may employ a similar process to a cooling process performed during normal spot welding, as long as it is capable of transforming the nugget formed during the welding process into martensite. An example of such a process is a process in which the pair of electrodes are not retracted after the welding process and the pair of electrodes continue to hold the plural steel sheets in a non-energized state so as to allow heat from the steel sheets to dissipate into the electrodes. Another example of such a process is a process in which the pair of electrodes are retracted after the welding process so as to allow heat from the steel sheets to dissipate in air while the plural steel sheets are being conveyed to the spot welding apparatus employed in the tempering process.

Note that in the latter process, since the nugget cools in a state in which the pair of electrodes have been retracted, any thinning of the nugget can be suppressed since the nugget is not being applied with pressure from the electrodes. This is advantageous due to enabling a high joint strength to be stably achieved. Moreover, as a result of the process to retract the pair of electrodes, the plural steel sheets or welded joint cool while being conveyed after the welding process. This is advantageous in terms of productivity since it enables concurrent implementation of the welding process and the tempering process at separate weld locations.

Examples of cooling conditions employed during the cooling process include cooling duration or holding duration, as well as cooling temperature. Such a cooling condition may be that the nugget reaches a temperature of the Ms point or below, this being the temperature at which the nugget transforms into martensite, after the welding process. A cooling condition such that the nugget reaches a temperature of the $M_f$ point or below is preferable.

[Tempering Process]

The tempering process of the present disclosure is a process of tempering at least the nugget by post-heating in a direction that is oblique to the sheet thickness direction of the plural steel sheets (namely, an oblique direction) after cooling.

The tempering process is a tempering process in which the plural steel sheets are energized in the oblique direction after cooling so as to temper martensite structures in at least the nugget, and in particular martensite structures in the nugget and the heat affected zone. Apart from post-heating in the oblique direction, the tempering process may be performed in a similar manner to a post heat process or a tempering process employed in a normal post heat method or two-stage energization method.

Note that whether or not the nugget has been tempered by such a post heat method or two-stage energization method may be confirmed by measuring a hardness distribution of the nugget. Tempering is confirmed when partial or full softening of the hardness is present after the post heat method or two-stage energization method. Although not illustrated in the drawings, during the tempering process, some or all of the upper electrode 2, the lower electrode 3, the upper fixing member 4, or the lower fixing member 5 may be employed to apply pressure to the sheet grouping. Such pressure application enables the upper electrode 2 and the lower electrode 3 to make more reliable contact with the sheet grouping.

Specific explanation follows regarding the tempering process, with reference to an exemplary embodiment of the present disclosure.

In the manufacturing method according to an exemplary embodiment of the present disclosure, the tempering process employs the tempering device 102 included in the spot welding apparatus 1 illustrated in FIG. 2. Note that FIG. 2 illustrates only the surroundings of the electrodes of the tempering device 102 of the spot welding apparatus 1. As illustrated in FIG. 2, two steel sheets, these being the upper sheet 8 serving as a first steel sheet and the lower sheet 9 serving as a second steel sheet, are overlapped as a sheet grouping, and the overlapped sheet grouping can be interposed between the spot welding apparatus 1 in a sheet thickness direction $D_T$.

The tempering device 102 of the spot welding apparatus 1 includes the upper electrode 2, the lower electrode 3, the upper fixing member 4, the lower fixing member 5, an upper holder member 6, and a lower holder member 7 as principal configuration members. The upper electrode 2 is disposed at an upper side of the sheet grouping, and the lower electrode 3 is disposed at a lower side of the sheet grouping.

The upper electrode 2 corresponds to a first electrode of the present disclosure. The lower electrode 3 corresponds to a second electrode of the present disclosure. The lower fixing member 5 corresponds to a first fixing member of the present disclosure. The upper fixing member 4 corresponds to a second fixing member of the present disclosure. Note that FIG. 2 illustrates an example in which the lower fixing member 5 is disposed substantially coaxially to the upper electrode 2 along an up-down direction so as to correspond to the upper electrode 2. Moreover, FIG. 2 illustrates an example in which the upper fixing member 4 is disposed substantially coaxially to the lower electrode 3 along an up-down direction so as to correspond to the lower electrode 3. However, the present disclosure is not limited thereto, and the first fixing member and the second fixing member do not need to be disposed coaxially with the electrodes across the sheet grouping. The first fixing member and the second fixing member may be disposed further toward the inside, namely further toward the nugget N side in FIG. 2 than the corresponding electrodes, or may be disposed further toward the outer side, namely further away from the nugget N in FIG. 2, than the corresponding electrodes.

The upper fixing member 4 and the lower fixing member 5 are both fixing members. The upper fixing member 4 is disposed at the upper side of the sheet grouping, and the lower fixing member 5 is disposed at the lower side of the sheet grouping. The sheet grouping can be interposed between the upper fixing member 4 and the lower fixing member 5. The upper holder member 6 holds the upper electrode 2 and the upper fixing member 4, and is capable of moving in the up-down direction. The lower holder member 7 holds the lower electrode 3 and the lower fixing member 5.

As illustrated in FIG. 2, the upper electrode 2 and the lower electrode 3 of the tempering device 102 of the spot welding apparatus 1 are disposed at positions on mutually opposing sides of the nugget N formed during the welding process in a sheet-plane direction $D_h$ that is orthogonal to the sheet thickness direction $D_T$. This enables the tempering device 102 of the spot welding apparatus 1 to easily implement post heat of the two steel sheets in the oblique direction after cooling.

Note that the upper electrode 2 and the lower electrode 3 illustrated in FIG. 2 are respectively configured by circular rod shaped conductive members. For example, these conductive members are each configured by a circular rod made of a Cu—Cr alloy. Each of the conductive members extends in a direction orthogonal to both the sheet thickness direction $D_T$ and the sheet-plane direction in which the two electrodes are arranged. Namely, each of the conductive members extends in a direction orthogonal to a length direction of the two steel sheets. The upper electrode 2 and the lower electrode 3 each make linear contact with a surface of the corresponding steel sheet (namely the upper sheet 8 or the lower sheet 9).

Moreover, in the tempering device 102 of the spot welding apparatus 1, as illustrated in FIG. 3, the upper fixing member 4 and the lower fixing member 5 are disposed positioned on mutually opposing sides of the nugget N formed in the welding process in the sheet-plane direction $D_h$. As a result, the upper fixing member 4 is positioned on the opposite side of the nugget N from the upper electrode 2 in the sheet-plane direction $D_h$. The lower fixing member 5 is positioned on the opposite side of the nugget N from the lower electrode 3 in the sheet-plane direction $D_h$. The tempering device 102 of the spot welding apparatus 1 is thus capable of fixing the two steel sheets even more reliably when post-heating the two steel sheets in an oblique direction after cooling. This thereby enables the occurrence of external factors such as positional misalignment of the steel sheet or space between the steel sheets and the electrodes to be made more unlikely.

Note that although an inter-sheet separation (gap) between the upper sheet 8 and the lower sheet 9 is formed at both ends in the left-right direction in FIG. 2 of the sheet grouping in the example illustrated in FIG. 2, there is no limitation thereto. As illustrated in FIG. 3, such an inter-sheet separation need not be formed in the present disclosure.

Moreover, in the present exemplary embodiment, as illustrated in FIG. 4 as viewed in plan view, namely as viewed along the sheet thickness direction, each of the upper electrode 2 and the lower electrode 3 has a constant width W along the up-down direction in FIG. 4. Each of the upper electrode 2 and the lower electrode 3 has substantially the same width W, and an indentation (pressing mark) H on the nugget N has a diameter of at least ϕ as measured in a sheet-plane direction. As illustrated by solid lines as an example in FIG. 4, the shape of a contact region M1 of the upper electrode 2 on the left side of the upper sheet 8 is a rectangular shape. As illustrated by dashed lines as an example in FIG. 4, the shape of a contact region M2 of the lower electrode 3 on the right side of the upper sheet 8 is also a rectangular shape. In the present exemplary embodiment, the contact region M1 of the upper electrode 2 and the contact region M2 of the lower electrode 3 are formed symmetrically to one another about the nugget N in plan view.

Note that an example of a state in which the upper electrode 2 with the constant width W along the up-down direction is separated from the upper sheet 8 is illustrated on the upper left side in FIG. 4. An example of a state in which the lower electrode 3 with the constant width W along the up-down direction is separated from the lower sheet 9 is illustrated on the lower right side in FIG. 4. Configuration of the tempering device 102 other than the upper electrode 2 and the lower electrode 3 is omitted from illustration in the interests of simplicity.

As illustrated in FIG. 4, in the present exemplary embodiment, a circular outer edge H of the indentation, this being a pressing mark formed by the upper electrode 2A illustrated in FIG. 1, may be considered to correspond to the circular outer edge of the nugget N in plan view. The circular outer edge H of the indentation from the upper electrode 2A can be seen when viewing the exterior of a welded joint 10. Note that since the shapes of the tips of the upper electrode 2A and the lower electrode 3A are substantially the same as each other, a circular outer edge of an indentation from the lower electrode 3A may also be considered to correspond to the circular outer edge of the nugget N in plan view.

In plan view, the "circular" shape of the outer edge of the indentation and the "circular" shape of the nugget N are not limited to perfectly circular shapes, and may be considered to be circular overall even when some local distortions are present, and treated as if circular. Moreover, the shape of the outer edge of the indentation and the shape of the nugget N in plan view are not limited to circular shapes, and for example elliptical shapes or other geometric shapes may be adopted therefor as appropriate.

Note that the upper fixing member 4 and the lower fixing member 5 illustrated in FIG. 2 are configured by circular rod shaped electrically insulating members extending in the same direction as the upper electrode 2 and the lower electrode 3. These electrically insulating members may, for example, be circular ceramic rods. When a sheet grouping is interposed between the upper fixing member 4 and the lower fixing member 5 and between the upper electrode 2 and the lower electrode 3, the upper fixing member 4 and the lower fixing member 5 make linear contact with the surface of the corresponding steel sheet (namely the upper sheet 8 or the lower sheet 9). Configuring the fixing members from such electrically insulating members enables any effect on the oblique direction post heat performed by the upper electrode and the lower electrode to be prevented.

In the present disclosure, the tempering device of the spot welding apparatus employed in the tempering process is not limited to a configuration such as that of the tempering device 102 of the spot welding apparatus 1 illustrated in FIG. 3, as long as it is capable of post-heating plural steel sheets in the oblique direction after cooling. Namely, the tempering device of the spot welding apparatus employed in the tempering process may include three or more electrodes disposed so as to enable oblique direction post heat of the plural steel sheets after cooling. Alternatively, the tempering device of the spot welding apparatus may include a single or three or more fixing members disposed so as to be capable of fixing the plural steel sheets during post heat.

Note that in cases in which the placement of the electrodes or the like is such that there is little concern of movement or misalignment of the plural steel sheets during post heat, fixing members such as those described above may be omitted from the spot welding apparatus.

In the manufacturing method of the present exemplary embodiment, the tempering process is specifically formed in the following manner using the tempering device 102 of the spot welding apparatus 1 described above.

First, a welded joint 10 is prepared by the welding process and the cooling process described above. As illustrated in FIG. 2, the welded joint 10 includes the upper sheet 8, the lower sheet 9 overlapped with the upper sheet 8, and a quenched nugget N joining the upper sheet 8 and the lower sheet 9 together. The upper electrode 2 is abutted against the upper sheet 8 at a site A, this being a location at an outer side of the nugget N in every plane running parallel to the upper sheet 8 of the welded joint 10. In order to achieve stable post heat, the site A is preferably interposed between the upper electrode 2 provided on the upper sheet 8 side and the lower fixing member 5 provided on the lower sheet 9 side. To describe the site A in other words, the site A runs through the upper sheet 8 and the lower sheet 9 in a direction perpendicular to the upper sheet 8, and projections of the site A and the nugget N do not overlap when the welded joint 10 is viewed along the direction perpendicular to the upper sheet 8.

Moreover, the lower electrode 3 is abutted against the lower sheet 9 at a site B, this being a location at an outer side of the nugget N in every plane running parallel to the upper sheet 8 of the welded joint 10 and positioned on the opposite side of the nugget N from the site A. In order to achieve stable post heat, the site B is preferably interposed between the lower electrode 3 provided on the lower sheet 9 side and the upper fixing member 4 provided on the upper sheet 8 side. To describe the site B in other words, the site B runs through the lower sheet 9 and the upper sheet 8 in a direction perpendicular to the upper sheet 8, and projections of the site B and the nugget N do not overlap when the welded joint 10 is viewed along the direction perpendicular to the upper sheet 8. The site A and the site B are positioned with axial symmetry to each other about a central axis passing through a center E of the nugget N in a direction perpendicular to the upper sheet 8.

Namely, after the cooling process, the two steel sheets are energized in an oblique direction by abutting the upper electrode 2 and abutting the lower electrode 3 of the tempering device 102 of the spot welding apparatus 1 illustrated in FIG. 2 against the upper sheet 8 at the site A of the welded joint 10 and against the lower sheet 9 at the site B of the welded joint 10 respectively, and passing a current through the welded joint 10 between the upper electrode 2 and the lower electrode 3. Preferably, the welded joint 10 is interposed in the sheet thickness direction $D_T$ between the upper electrode 2 and upper fixing member 4, and the lower electrode 3 and lower fixing member 5, and the current is passed through the welded joint 10 between the upper electrode 2 and the lower electrode 3 while applying a pressurizing force using the upper electrode 2 and the lower electrode 3 when post-heating the two steel sheets in the oblique direction.

Moreover, when the current is passed through the welded joint 10, as illustrated in FIG. 4, the upper electrode 2 has the constant width W in a plane running parallel to the upper sheet 8, and the width W of the upper electrode 2 is at least the maximum diameter φ of the nugget N in a plane running parallel to the upper sheet 8. Similarly, the lower electrode 3 has the constant width W in a plane running parallel to the lower sheet 9, and the width W of the lower electrode 3 is at least the maximum diameter φ of the nugget N in a plane running parallel to the lower sheet 9.

When this is performed, as illustrated in FIG. 2, a energization path $C_P$ through the two steel sheets runs across a broad region including the nugget N and the periphery of the nugget N. Since the energization path $C_P$ runs across such a broad region, the current density is reduced. Thus, this broad region including not only the nugget N but also the heat affected zone peripheral to the nugget N is gently heated, enabling tempering to occur. This enables a broad range of suitable current conditions to be secured in which a tempering effect can be obtained.

FIG. 6 are diagrams illustrating hardness (Vickers hardness; HV) distribution in welded joints that have been subjected to a conventional tempering process and welded joints that have been subjected to the tempering process of the present disclosure.

Note that of FIG. 6, the distribution diagram FIG. 6A illustrates a hardness distribution for a welded joint that has been subjected only to a welding process and a cooling process, and has not been subjected to a tempering process. The distribution diagram FIG. 6B illustrates a hardness distribution for a welded joint for which a cool time (cooling duration) after a welding process is set to 99 cyc, and a tempering process is performed under conventional tempering conditions (post heat current: 3.9 kA, post heat time: 99 cyc, post heat direction: sheet thickness direction). Note that in the present exemplary embodiment, one second corresponds to 60 cyc.

Figure 6B:
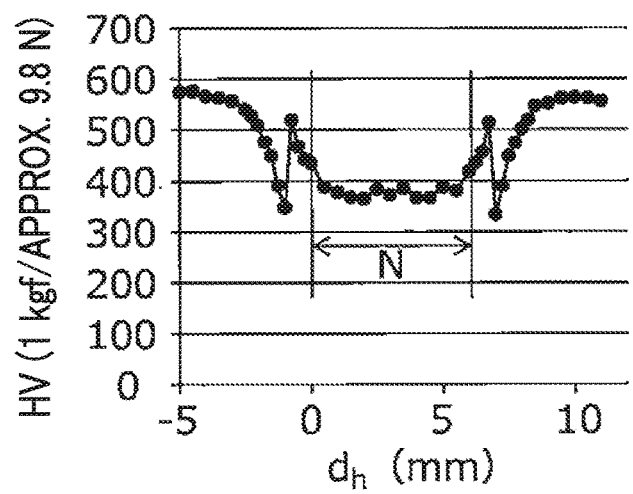
FIG. 6B is a diagram illustrating a hardness distribution in a welded joint subjected to a conventional tempering process.
Figure 6C:
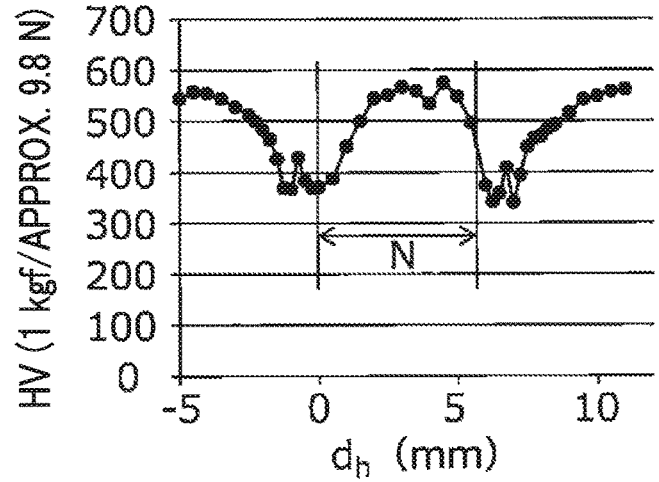
FIG. 6C is a diagram illustrating a hardness distribution in a welded joint subjected to a conventional tempering process.

The distribution diagram FIG. 6C illustrates a hardness distribution for a welded joint that has been subjected to a tempering process under the same conventional tempering conditions as those of the welded joint of the distribution diagram FIG. 6B, with the exception that the post heat current of the tempering process was set to 4.3 kA. The distribution diagram FIG. 6D and the distribution diagram FIG. 6E illustrate hardness distributions for welded joints that have been subjected to the tempering process of the present disclosure with the post heat current set to 7.0 kA and 8.0 kA respectively. Note that in the distribution diagram FIG. 6D and the distribution diagram FIG. 6E, the post heat time during the tempering process was set to 99 cyc in both cases. In FIGS. 6, the nugget region is indicated by the bidirectional arrows labeled N at the left-right direction center of the respective diagrams.

As illustrated in FIG. 6, in the welded joint corresponding to the distribution diagram FIG. 6A that was not subjected to a tempering process, the hardness of the nugget region and the hardness of the heat affected zone peripheral to the nugget are both hard (namely, exhibit low toughness). The heat affected zone peripheral to the nugget that has become hard is referred to hereafter as the "HAZ hardened region". The HAZ hardened region in FIG. 6A is susceptible to internal fracturing of the nugget (namely, interfacial fracture or partial plug fracturing).

On the other hand, in the welded joint corresponding to the distribution diagram FIG. 6B that has been subjected to a tempering process under conventional tempering conditions, hardness within the nugget is lowered (namely, toughness is improved) by the tempering. However, the hardness in the vicinity of end portions of the nugget N and the hardness of the HAZ hardened region are not sufficiently lowered. Accordingly, were there to be even slight misalignment in the softening position, if stress in a separating direction were to act on the welded joint, a nugget end, this being a location where cracking readily propagates, and a site of high hardness may align, causing the nugget to be susceptible to internal fracturing. Note that in the present exemplary embodiment, the nugget ends refer to the two ends of the nugget N illustrated in FIG. 6B.

The welded joint corresponding to the distribution diagram FIG. 6C is subjected to the tempering process under conventional tempering conditions, with the exception that the current value employed has been raised somewhat. In the welded joint corresponding to the distribution diagram FIG. 6C, the hardness in the vicinity of the nugget end portions and the hardness of the HAZ hardened region are lowered by the tempering. However, a central portion of the nugget reaches a temperature of the $A_3$ point or higher and consequently reverts back to martensite, thus increasing the hardness. Accordingly, were there to be even slight misalignment in the softening position, the nugget end and a site of high hardness may align, causing the nugget to be susceptible to internal fracturing.

In cases in which such spot welding is performed during mass production, the possibility of a site of high hardness aligning with a nugget end increases due to wear of the electrode tips, variations in thermal conductivity of the electrodes due to alloys forming between the electrodes and plating of the steel sheets, and so on. Moreover, the possibility of a site of high hardness aligning with a nugget end also increases due to variation in inter-steel sheet gaps, variation in the strike angle between the electrodes and the steel sheets, and so on. In particular, the width of inter-sheet gaps is liable to increase the higher the strength of the sheet steel employed. Namely, robustness is reduced as a result of the current passing through the weld being more liable to stray from a suitable range.

Accordingly, with tempering under conventional tempering conditions, since rapid heating occurs from the center of the nugget, it is very difficult to achieve uniform softening over a broad region spanning both the nugget and the heat affected zone.

Figure 6D:
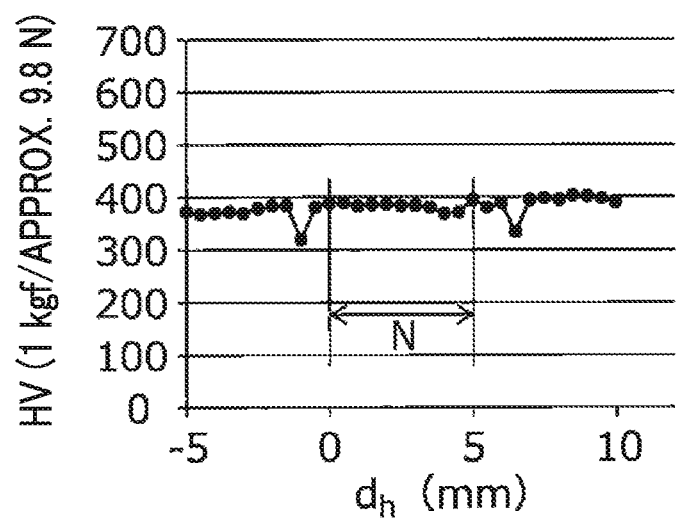
FIG. 6D is a diagram illustrating a hardness distribution in a welded joint subjected to a tempering process of the present disclosure.
Figure 6E:
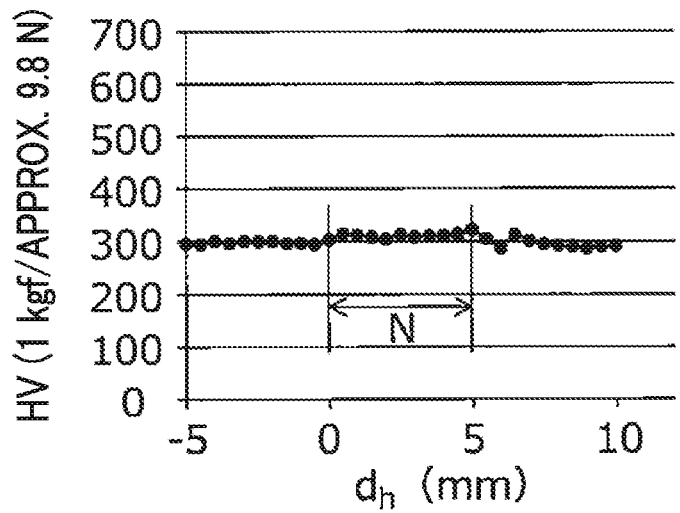
FIG. 6E is a diagram illustrating a hardness distribution in a welded joint subjected to a tempering process of the present disclosure.

By contrast, as described previously, the tempering process of the present disclosure enables the broad region including not only the nugget but also the heat affected zone peripheral to the nugget to be gently heated, thereby enabling the broad region spanning both the nugget and the heat affected zone to be uniformly softened, as seen in the hardness distributions illustrated by the distribution diagram FIG. 6D and the distribution diagram FIG. 6E. Note that in the distribution diagram FIG. 6D, portions of the heat affected zone in the vicinity of the nugget where the hardness is lowered are softened HAZ regions that are formed during the welding process.

Hardness measurement positions in the various welded joints illustrated in FIG. 6 are set as follows.

First, as illustrated in FIG. 5, as referenced against the mutually superimposed faces of the upper sheet 8 and the lower sheet 9, a point where a sheet-plane direction position $P_M$ at a depth of ¼ of the sheet thickness t of the upper sheet intersects with one side end portion of the nugget N is set as a reference point $P_s$. The hardness of the welded joint 10 is then measured at a predetermined pitch over a sheet-plane direction range spanning 10 mm from the reference point $P_s$ in a + direction (the right direction from the reference point $P_s$, in which the nugget N exists in FIG. 5) and a sheet-plane direction range spanning 5 mm from the reference point $P_s$ in a − direction (the left direction from the reference point $P_s$, in which the nugget N does not exist in FIG. 5). Note that the horizontal axis in the hardness distribution diagrams of FIGS. 6 indicates a distance $d_h$ (mm) in the sheet-plane direction from the reference point $P_s$.

The two steel sheets employed in the respective welded joints 10 were hot stamped members with 1.8 GPa grade tensile strength in each case. The sheet thickness t of the hot stamped members was 1.6 mm.

Note that in the present disclosure, with the exception of the post heat direction, the post heat conditions employed in the tempering process (post heat current, post heat time, electrode pressurizing force, and the like) may be set to any predetermined post heat conditions according to the desired joint strength and the like, as long as such conditions are capable of tempering at least the nugget. As an example of such post heat conditions, the tempering temperature is preferably set to a temperature condition within a range from 500° C. to the $A_{c3}$ point, and is more preferably set to a temperature condition within a range from 600° C. to the $A_{c1}$ point. Setting the tempering temperature within this range facilitates lowering of the hardness (namely, facilitates improving toughness) due to ensuring sufficient heat input, while not being susceptible to re-quenching which would cause re-hardening.

Moreover, the electrodes employed in the tempering process are not limited to circular rod shaped conductive members such as the upper electrode 2 and the lower electrode 3 described above. Electrodes such as those employed in normal spot welding may be employed as long as they are capable of post-heating the plural steel sheets in an oblique direction and of tempering at least the nugget. An example of electrodes employed in normal spot welding are DR-type electrodes that make point contact with steel sheets.

Note that adopting circular rod shaped conductive members such as the upper electrode 2 and the lower electrode 3 described above as the electrodes employed in the tempering process enables a broader region to be gently tempered, and thereby enables the advantageous effects of the present disclosure to be obtained to an even greater degree.

Moreover, the upper electrode and the lower electrode employed in the tempering process are preferably set such that an inter-electrode distance $d_e$ between the two electrodes in the sheet-plane direction is at least twice the diameter $\phi$ of the nugget. The site A and the site B in FIG. 2 are respectively separated from the center E of the nugget N by at least the diameter $\phi$ of the nugget N. The diameter $\phi$ of the nugget N is a length measured in a plane running parallel to the upper sheet 8 (a length along the left-right direction in FIG. 2).

Note that, for example, in cases in which the shape of the nugget N is a true circle, the diameter thereof may be adopted as the diameter $\phi$ of the nugget N. In cases in which the shape of the nugget N is not a true circle, such as an elliptical shape as illustrated in FIG. 2 or a circular shape with some distortion, the major axis thereof may be adopted as the maximum diameter $\phi$ of the nugget.

In cases in which the nugget N has an elliptical shape as illustrated in FIG. 2, the inter-electrode distance $d_e$ between the upper electrode 2 and the lower electrode 3 as measured along the left-right direction is at least twice the diameter $\phi$ of the nugget N. Setting the inter-electrode distance $d_e$ between the upper electrode and the lower electrode to at least twice the diameter $\phi$ of the nugget in this manner enables an even broader region including the nugget and the heat affected zone to be gently tempered, and thereby enables the advantageous effects of the present disclosure to be obtained even more reliably.

Note that as illustrated in FIG. 2, the inter-electrode distance $d_e$ between the upper electrode and the lower electrode in the sheet-plane direction refers to the sheet-plane direction distance between center axes of the respective electrodes, extending in the up-down direction. Approach and retract directions of the upper electrode 2 and approach and retract directions of the lower electrode 3 are mutually opposing directions to each other, and the inter-electrode distance $d_e$ configuring the spacing between the upper electrode 2 and the lower electrode 3 is at least 6 mm in a plane orthogonal to these respective approach and retract directions.

Note that the approach direction of the upper electrode 2 with respect to the sheet grouping is a direction heading from the upper side toward the lower side in FIG. 2, and the retract direction of the upper electrode 2 is a direction heading from the lower side toward the upper side in FIG. 2. The approach direction of the lower electrode 3 with respect to the sheet grouping is a direction heading from the lower side toward the upper side in FIG. 2, and the retract direction of the lower electrode 3 is a direction heading from the upper side toward the lower side in FIG. 2. In the example in FIG. 2, a flat plane in a direction orthogonal to these approach and retract directions is illustrated by a horizontal plane at the boundary between the upper sheet 8 and the lower sheet 9.

Moreover, the upper electrode and the lower electrode are preferably set such that a distance between the upper electrode and the nugget in the sheet-plane direction is equal to a distance between the lower electrode and the nugget in the sheet-plane direction. Namely, in FIG. 2, a distance between the site A and the center E of the nugget N is equal to a distance between the site B and the center E of the nugget N. When the distances between the upper electrode and the lower electrode and the nugget are in an equal relationship in this manner, a broad region including the nugget can be more uniformly heated in order to achieve tempering, thereby enabling the advantageous effects of the present disclosure to be obtained even more reliably.

Note that the distances between the upper electrode and the lower electrode and the nugget refer to the sheet-plane direction distances between central axes running through the respective electrodes in the up-down direction and the nugget center.

Moreover, the fixing members employed in the tempering process are not limited to circular rod shaped electrically insulating members such as the upper fixing member 4 and the lower fixing member 5 described previously. For example, electrically insulating members of any predetermined shape may be employed according to the desired manner of holding, ease of holding, and so on, as long as they are capable of fixing the plural steel sheets so as to not move or become misaligned when the plural steel sheets are energized in an oblique direction.

However, employing circular rod shaped electrically insulating members such as the upper fixing member 4 and the lower fixing member 5 described previously as the fixing members employed in the tempering process enables the plural steel sheets to be fixed more stably. This enables the advantageous effects of the present disclosure to be obtained even more reliably.

Moreover, in the present disclosure, in cases in which plural welding target locations are present on a single sheet grouping, when performing the cooling process for one welding target location, at least one process out of the welding process or the tempering process is preferably performed concurrently at another of the welding target locations. Performing the welding process through to the tempering process concurrently at the plural welding target locations in this manner enables welded joint productivity to be further improved. Note that similar also applies in cases in which spot welding is performed in succession while conveying plural sheet groupings.

Note that in the present disclosure, processes to perform predetermined processing or the like may be provided before and/or after each process from the welding process through to the tempering process.

Next, explanation follows regarding the sheet steel employed in the manufacturing method of the present disclosure.

<Sheet Steel>

In the present disclosure, sheet steel having predetermined tensile strength and sheet thickness corresponding to the desired joint strength and the purpose of the joint (for example, for use in automobile components) may be employed for the plural steel sheets configuring a welding target. An example of such sheet steel is sheet steel with tensile strength from 270 MPa grade to 3000 MPa grade. Such sheet steel may be sheet steel plated with zinc or the like (namely, plated sheet steel).

Of such sheet steel, high-strength sheet steel with tensile strength of 780 MPa or higher becomes brittle at the welds and is susceptible to fracturing after welding. Accordingly, the present disclosure is particularly advantageous when applied to a sheet grouping of which at least one steel sheet is a high-strength sheet steel with tensile strength of 780 MPa or higher. In the present exemplary embodiment, the upper sheet 8 and the lower sheet 9 are configured from high-strength sheet steel for automotive use.

Note that in the present disclosure, all of the plural steel sheets may be configured from the same type of sheet steel, or some of the plural steel sheets may be configured from the same type of sheet steel. Alternatively, all of the steel sheets may be configured from different types of sheet steel.

Moreover, the number of steel sheets is not particularly limited, and two or more thereof may be employed according to the purpose of the welded joint. Moreover, although the sheet thickness of the steel sheets is not particularly limited, the thickness of a single sheet thereof is preferably between 0.5 mm and 3.2 mm.

Moreover, in the present disclosure, the shapes of the steel sheets are not particularly limited, as long as at least a welding target location of a steel sheet has a specific sheet shaped structure to be overlapped with a welding target location of another steel sheet along the sheet thickness direction. Namely, the steel sheets employed in the present disclosure may, for example, be flat plate shaped steel sheets, or steel sheets with a flattened sheet shaped structure overall. Alternatively, for example, a steel sheet employed in the present disclosure may have a locally sheet shaped structure at a portion including a welding target location, and a bent structure or the like at portions other than the sheet shaped structure, such as an L-shaped steel sheet or a hat-shaped steel sheet.

The manufacturing method of the present disclosure is not limited to the exemplary embodiment described above nor to Examples, described below. Various combinations, substitutions, and modifications may be implemented within a range not departing from the objective and spirit of the present disclosure.

EXAMPLES

More specific explanation follows regarding the present disclosure, with reference to Examples and Comparative Examples. Note that the present disclosure is not limited to such Examples.

Examples (Welding Process)

A sheet grouping configured by overlapping two steel sheets, namely an upper sheet and a lower sheet, was interposed between a pair of electrodes of a spot welding apparatus. Each of the two steel sheets was configured by an un-plated hot stamped steel sheet with 1.5 GPa grade tensile strength and a sheet thickness of 1.2 mm. The pair of electrodes were both DR-type 40-16 electrodes with a diameter ϕ of 6 mm.

This sheet grouping was then energized along the sheet thickness direction, employing a weld current of 5.5 kA and a weld time of 16 cyc while applying a pressurizing force of 400 kgf (approximately 3923 N) to the sheet grouping, thereby forming a nugget at the mutually superimposed faces of the two steel sheets and in a region in the vicinity of the mutually superimposed faces. The weld by the electrodes was then stopped, and the sheet grouping was maintained in a state applied with the pressurizing force from the electrodes for a holding duration of 10 cyc.

(Cooling Process)

After welding, the sheet grouping was then air-cooled until reaching room temperature (namely, the $M_f$ point or below).

(Tempering Process)

The sheet grouping was then moved to a tempering device of a spot welding apparatus configured similarly to the tempering device 102 of the spot welding apparatus 1 illustrated in FIG. 2, and the sheet grouping was interposed in the sheet thickness direction between the upper electrode and upper fixing member and the lower electrode and lower fixing member. A region including the nugget and the heat affected zone was then tempered by being energized in an oblique direction with an post heat current ranging from 5.0 to 10.0 kA as given in Table 1 below for an post heat time of 60 cyc, while applying a pressurizing force of 300 kgf (approximately 2942 N).

Next, the post heat of the electrodes was stopped, and the sheet grouping was maintained in an interposed state for a holding duration of 10 cyc in order to obtain a welded joint in which the two steel sheets were joined together. Note that a total of 11 Example welded joints were produced, one for each of the tempering process post heat currents given in Table 1.

Note that the tempering device of the spot welding apparatus employed in the tempering process was provided with Cu—Cr alloy circular rod electrodes as the upper electrode and the lower electrode. The upper electrode and the lower electrode each had a length of 50 mm and a diameter ϕ of 10 mm. The inter-electrode distance $d_e$ between the upper electrode and the lower electrode in the sheet-plane direction was 50 mm. The spot welding apparatus employed in the tempering process was provided with ceramic circular rods as the upper fixing member and the lower fixing member. The upper fixing member and the lower fixing member each had a length of 50 mm and a diameter ϕ of 10 mm.

Comparative Example 1

A welded joint of a Comparative Example 1 was produced similarly to the Examples, with the exception that a tempering process was not performed.

Comparative Examples 2

Welded joints of Comparative Examples 2 were produced similarly to the Examples, with the exception that the cooling process used a cool time of 60 cyc and the tempering process was performed using the pair of electrodes of the spot welding apparatus employed in the welding process. Namely, in these Comparative Examples, post heat was performed along the sheet thickness direction instead of in an oblique direction.

The welded joints of the Examples, the Comparative Example 1, and the Comparative Examples 2 produced as described above were fractured by chisel testing in order to confirm the fracture modes thereof. Table 1 gives confirmation results for the fracture modes.

Note that the welded joints of the Examples, the Comparative Example 1, and the Comparative Examples 2 each had the same nugget diameter ϕ, this being approximately 4√t, and specifically approximately 4.4 mm.

As illustrated by the Examples having a fracture mode of "plug fracture" in Table 1, it can be seen that the welded joints of the Examples could be made to exhibit the fracture mode of "plug fracture" across a wide range of tempering process conditions (namely an post heat current range) spanning from 6.5 kA to 10.0 kA. The fracture mode of "plug fracture" is indicative of high joint strength. Accordingly, it can be seen that the Examples demonstrate an excellent degree of robustness.

By contrast, as illustrated in Table 1, the welded joint of the Comparative Example 1 exhibited a fracture mode of "interfacial fracture". The fracture mode of "interfacial fracture" is indicative of low joint strength. Moreover, as illustrated by the Comparative Examples 2 having a fracture mode of "plug fracture" in Table 1, although the welded joints of the Comparative Examples 2 did exhibit a fracture mode of "plug fracture", the range of tempering process conditions across which "plug fracture" was obtained was very narrow, namely from 4.5 kA to 5.5 kA. Namely, it can be seen that Comparative Example 1 and Comparative Examples 2 demonstrate poor robustness.

It is thought that the wide range of tempering process conditions for the Examples is due to the gentle change in temperature as the temperature rises in response to the current. Specifically, as illustrated in FIG. 7, in the case of the Examples, the temperature rises more gradually than in Comparative Example 1 from a start timing T0 to an end timing T1 of the post heat process.

This is thought to be since the energization path in the tempering process of the Examples is broader, in other words the current density is lower, than in conventional tempering such as that employed for the Comparative Examples 2. This may also be inferred from the fact that the Examples are capable of obtaining the fracture mode of plug fracture at higher currents than the Comparative Examples 2.

Operation and Advantageous Effects

In the manufacturing method of the welded joint 10 according to the present exemplary embodiment, the pair of electrodes are separated from each other such that the pair of electrodes on either side of the steel sheets do not overlap each other in the thickness direction. Accordingly, when passing a tempering current between the pair of electrodes, the length of the energization path $C_P$ is longer than it would be were the electrodes to overlap each other. In other words, the nugget is tempered by being energized in the oblique direction.

Note that "the length of the energization path $C_P$ is longer" encompasses a state in which the area of the energization path $C_P$ is larger in plan view. Namely, the present disclosure encompasses cases in which the shapes of the respective regions of the steel sheets contacted by the pair of electrodes are planar shapes instead of points in plan view.

Increasing the length of the energization path $C_P$ enables the current density per unit area of the energization path $C_P$ to be lowered. Since this enables the passage of current to be suppressed from becoming excessive, the current can be easily controlled when performing tempering in the post heat process, for example without the need to introduce a new current control mechanism when employing welding equipment provided with an existing current control mechanism. This makes the post heat process less liable to be affected by external factors, enabling a manufacturing method of a welded joint with excellent robustness to be provided.

Moreover, in the manufacturing method of the welded joint 10 according to the present exemplary embodiment, the site A and the site B are each separated from the center E of the nugget N by at least the maximum diameter of the nugget N. This enables tempering to be performed gently over an even broader region not limited to the nugget N but including both the nugget N and the heat affected zone.

Moreover, in the manufacturing method of the welded joint 10 according to the present exemplary embodiment, the distance between the site A and the center E of the nugget N is equal to the distance between the site B and the center E of the nugget N. This enables more uniform heating and tempering of a broad region including the nugget N.

Moreover, in the manufacturing method of the welded joint 10 according to the present exemplary embodiment, the site A is interposed between the upper electrode 2 and the lower fixing member 5, thereby eliminating a gap between the upper sheet 8 and the lower sheet 9 at the position of the site A. Moreover, the site B is interposed between the lower electrode 3 and the upper fixing member 4, thereby eliminating a gap between the upper sheet 8 and the lower sheet 9 at the position of the site B. Gaps in regions around the nugget N are thus eliminated, placing the respective steel sheets in close contact with each other. As a result, a broad region including not only the nugget N but also the heat affected zone peripheral to the nugget N can be gently heated. This enables uniform melting to be achieved over the broad region spanning both the nugget N and the heat affected zone.

In the manufacturing method of the welded joint 10 according to the present exemplary embodiment, the widths W of the upper electrode 2 and the lower electrode 3 are set to at least the maximum diameter ϕ of the nugget N, enabling the nugget N to be more reliably energized. Note that although the widths W of the upper electrode 2 and the lower electrode 3 may be the same as the maximum diameter ϕ of the nugget N, setting the widths W to at least the maximum diameter ϕ further increases the length of the energization path $C_P$. This enables burn-through and the like to be prevented, and is thus advantageous from the perspective of increasing robustness.

Moreover, in the manufacturing method of the welded joint 10 according to the present exemplary embodiment, when current is passed through the welded joint 10 between the upper electrode 2 and the lower electrode 3, the current is passed through the inside of the welded joint 10 in a region outside of the nugget N, thus increasing the length of the energization path $C_P$. This enables the current density per unit area to be further lowered on the energization path $C_P$.

Moreover, the manufacturing method of the welded joint 10 according to the present exemplary embodiment is not liable to be affected by external factors during the post heat process, enabling a welded joint 10 with excellent robustness to be realized. Note that in the welded joint 10 illustrated in the example of FIG. 8, the site A, this being a location at the outer side of the nugget N in a plane running parallel to the upper sheet 8, is formed with a contact mark X where the upper electrode 2 made contact in order to perform post heat. Moreover, the site B, this being a location at the outer side of the nugget N in a plane running parallel to the lower sheet 9 and positioned on the opposite side of the nugget N from the site A, is formed with a contact mark Y where the lower electrode 3 made contact in order to perform post heat. Note that the contact mark X and the contact mark Y may have a different color to the surrounding regions due to the post heat.

Figure 8:
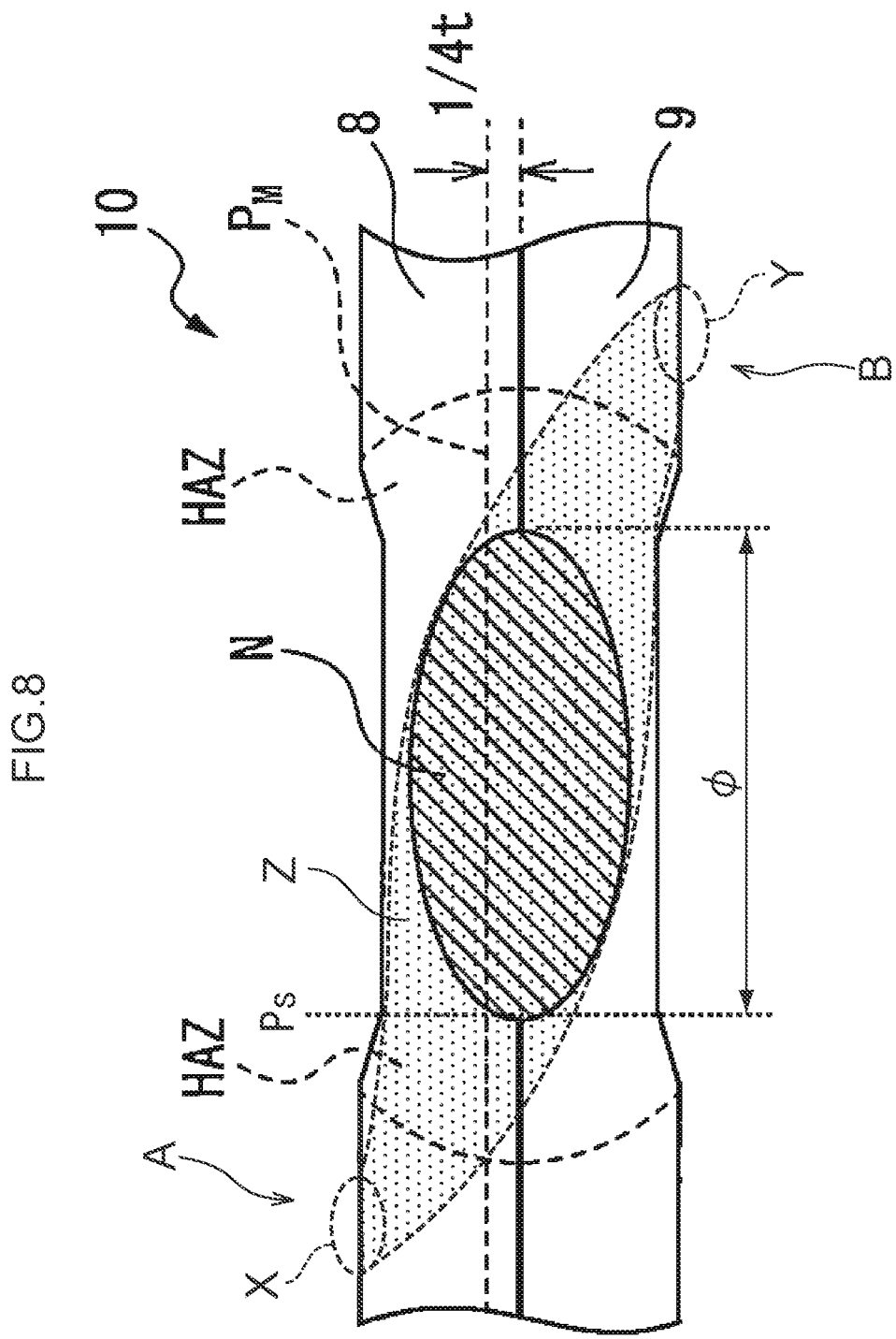
FIG. 8 is a perspective view to assist explanation of a welded joint obtained through a welded joint manufacturing method according to an exemplary embodiment of the present disclosure.

FIG. 8 illustrates an example in which a softened structure Z is continuously present between the contact mark X and the contact mark Y, as indicated by dotted shading. For example, for sheet steel having tensile strength of 1180 MPa or greater, for which welded joint fracture issues are particularly pronounced, the structure is controlled, resulting in higher strength. High strength structures are softened by post heat. For example, martensite structures become tempered martensite structures. Moreover, for example, post heat reduces migration in structures that have been subjected to hardening processing. The softened structure Z can be confirmed to have Vickers hardness (HV) lower than the hardness of a base metal outside of the softened structure Z by at least 10 HV. For example, measuring the Vickers hardness (HV) of the softened structure Z as illustrated in FIG. 6D and FIG. 6E enables the presence of the softened structure to be determined since lower values are obtained than for other structures where tempering has not occurred.

In the tempering device 102 according to the present exemplary embodiment, the inter-electrode distance $d_e$ between the upper electrode 2 and the lower electrode 3 is set to at least 6 mm. This is advantageous when forming a nugget N with a width of 6 mm, this being a commonly employed width in such welded joints 10.

In the tempering device 102 according to the present exemplary embodiment, the upper fixing member 4 is provided on an approach/retract direction axis of the lower electrode 3. Moreover, the lower fixing member 5 is provided on an approach/retract direction axis of the upper electrode 2. This enables the post heat process to be implemented more stably.

Moreover, in the present exemplary embodiment, the tensile strength of the upper sheet 8 and the tensile strength of the lower sheet 9 are both at least 440 MPa. Accordingly, in cases in which high-strength sheet steel for automotive use is employed for the upper sheet 8 and the lower sheet 9, a desirable welded joint 10 for automotive use can be obtained. Note that in the present disclosure, either the upper sheet 8 or the lower sheet 9 may be configured from sheet steel with tensile strength of at least 440 MPa. Moreover, in cases in which a welded joint is configured from three or more steel sheets, the tensile strength of at least one of the steel sheets should be at least 440 MPa.

Moreover, in the present exemplary embodiment, when performing tempering, the upper electrode 2 and the lower electrode 3 are separated from indentations of the nugget N. Namely, even if a step has been formed on the upper sheet 8 by such an indentation, the upper electrode 2 does not contact this step. Similarly, the lower electrode 3 does not contact such a step on the lower sheet 9. This enables the upper electrode 2 to contact the upper sheet 8 smoothly, and enables the lower electrode 3 to contact the lower sheet 9 smoothly.

First Modified Example

Figure 9:
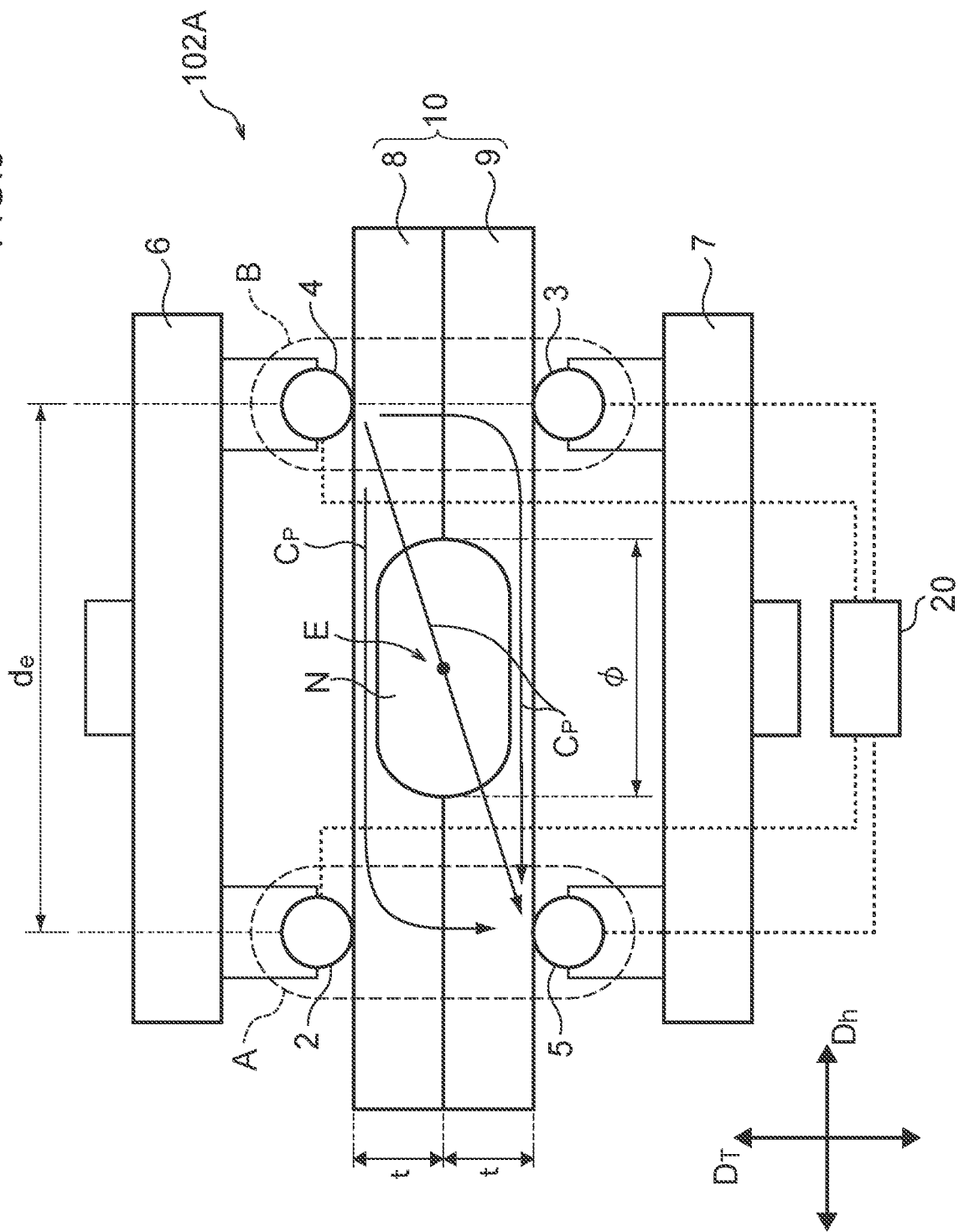
FIG. 9 is a cross-section illustrating the periphery of electrodes included in a spot welding apparatus employed in a tempering process of a welded joint manufacturing method according to a first modified example.

In a tempering device 102A according to a first modified example illustrated in FIG. 9, the upper fixing member 4 is a third electrode. Moreover, the lower fixing member 5 is a fourth electrode. Namely, the upper fixing member 4 and the lower fixing member 5 both have a post heat function, and function as a tempering device. Note that conversely, electrodes may be employed to fix the welded joint 10 in the present disclosure.

The tempering device 102A according to the first modified example includes an energization controller 20 configured to alternately execute energization between the upper electrode 2 and the lower electrode 3 and energization between the upper fixing member 4 serving as a third electrode and the lower fixing member 5 serving as a fourth electrode. Accordingly, in the post heat process, the four electrodes that are the upper electrode 2, the lower electrode 3, the upper fixing member 4, and the lower fixing member 5 are able to execute post heat with energization paths that form an X shape.

Operation and Advantageous Effects

The tempering device 102A according to the first modified example alternately executes energization between the upper electrode 2 and the lower electrode 3 and energization between the third electrode and the fourth electrode, thus enabling the post heat process to be implemented with greater efficiency.

Second Modified Example

Figure 10:
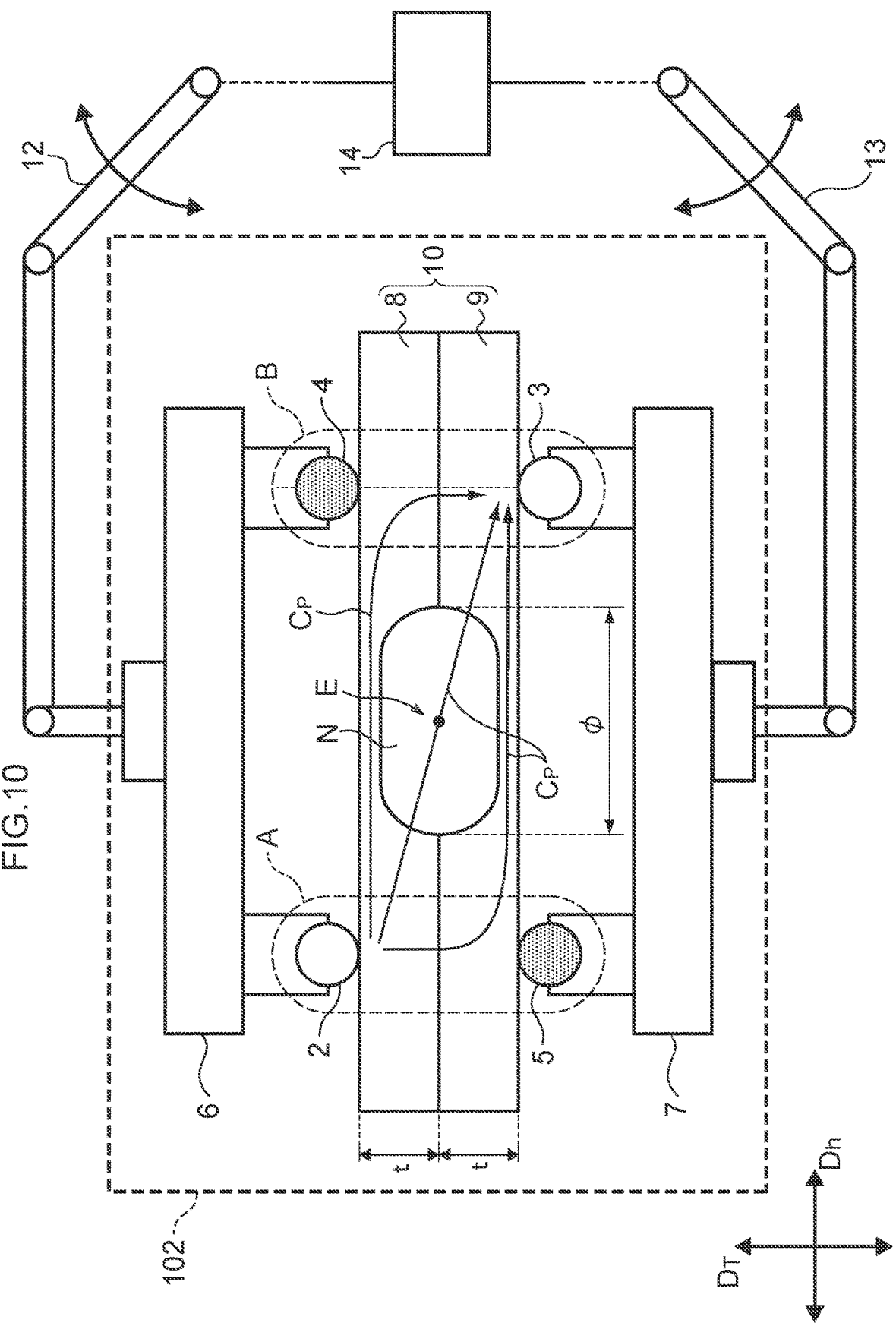
FIG. 10 is a cross-section illustrating the periphery of electrodes included in a spot welding apparatus employed in a tempering process of a welded joint manufacturing method according to a second modified example.

A welding apparatus according to a second modified example illustrated in FIG. 10 includes the tempering device 102, a pair of robot arms 12, 13 provided to the tempering device 102, and a position controller 14 that controls operation of the robot arms 12, 13. Alternatively configuration may be made such that gripper fingers 12, 13 are attached to a leading end of a single robot arm and the position controller 14 controls operation of the robot arm and the grippers. The configuration in which grippers are provided to a leading end of a single robot arm may be adopted in cases in which a nugget is provided at an end portion of steel sheets. The configuration including two robot arms may be adopted in cases in which a nugget is provided at a central portion of the steel sheets.

The robot arm 12 illustrated on the upper side in FIG. 10 is capable of making the upper electrode 2 independently approach and retract from the upper sheet 8. The robot arm 13 illustrated on the lower side in FIG. 10 is capable of making the lower electrode 3 independently approach and retract from the lower sheet 9. The positions and orientations of the electrodes 2, 3, attached to the pair of robot arms 12, 13 or the electrodes 2, 3, attached to the gripper fingers 12, 13 attached to the leading end of a single robot arm are controlled by the position controller 14.

The robot arms 12, 13, or the gripper fingers 12, 13 attached to the leading end of a robot arm, move an intermediate point between the tip of the upper electrode 2 and the tip of the lower electrode 3 to a location that has been welded as the nugget by the welding machine 101, and dispose the upper electrode 2 and the lower electrode 3 at an outer side of this welded location. Note that the welding machine that forms the nugget in the second modified example is similar to the welding machine 101 illustrated in FIG. 1. The welding machine is omitted from illustration in FIG. 10.

Operation and Advantageous Effects

Similarly to the case described in the present exemplary embodiment, the welding apparatus according to the second modified example is not liable to be affected by external factors during the post heat process, and is able to provide a welding apparatus capable of manufacturing the welded joint 10 with excellent robustness.

Other Exemplary Embodiments

Figure 11:
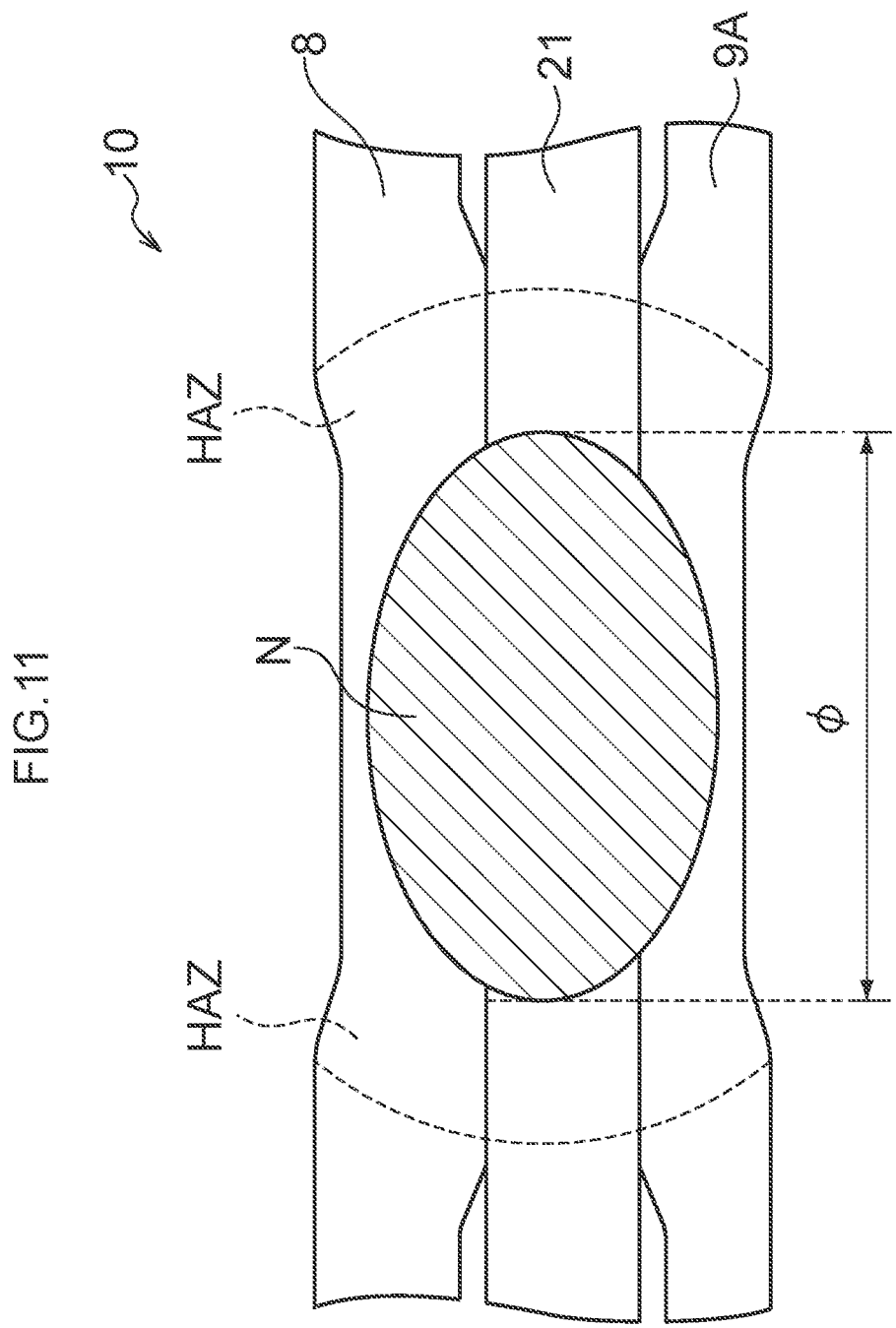
FIG. 11 is a cross-section of another welded joint of the present disclosure.

A welded joint of the present disclosure may be configured by three or more overlapped steel sheets. FIG. 11 illustrates an example of a welded joint in which a middle sheet 21 is interposed between the upper sheet 8 and a lower sheet 9A. Note that the upper sheet 8 and the middle sheet 21 have substantially the same thickness as each other, whereas the lower sheet 9A is thinner than the upper sheet 8 and the middle sheet 21. In the present disclosure, the thicknesses of the plural steel sheets may differ from each other as in the welded joint illustrated in FIG. 11.

For example, in welded joints for automotive use, an outer side steel sheet may be thinner than an inner side steel sheet. Accordingly, a welded joint according to the present disclosure that includes steel sheets having different thicknesses to each other may be advantageous as a welded joint for automotive use. Moreover, high-strength sheet steel may be employed in welded joints for automotive use. In the present disclosure, at least one of the steel sheets out of the plural steel sheets included in the welded joint should be configured by high-strength sheet steel.

The present disclosure may be configured using a combination of elements of the respective configurations illustrated in FIG. 1 to FIG. 11. The present disclosure encompasses various exemplary embodiments other than those described above. The technology scope of the present disclosure is determined only by the features in the invention in the scope of the patent claims as supported by the foregoing explanation.

INDUSTRIAL APPLICABILITY

The manufacturing method of the present disclosure is not liable to be affected by external factors and is able to secure excellent robustness during a post heat process, and is thus favorably applied to spot welding employing high-strength sheet steel such as sheet steel for automotive use.

The present disclosure accordingly has a high level of industrial applicability.
1 spot welding apparatus (welding apparatus)
2 upper electrode (first electrode)
3 lower electrode (second electrode)
4 upper fixing member (second fixing member)
5 lower fixing member (first fixing member)
6 upper holder member
7 lower holder member
8 upper sheet (first steel sheet)
9, 9A lower sheet (second steel sheet)
10 spot welded joint (welded joint)
12, 13 robot arm or gripper finger
14 position controller
20 energization controller
101 welding machine
102, 102A tempering device
N nugget
$C_p$ energization path
X, Y contact mark
Z softened structure
φ maximum diameter

SUPPLEMENT

The present specification conceptualizes the following aspects.

Specifically, a first aspect is a welded joint manufacturing method including:
preparing a welded joint including a first steel sheet, a second steel sheet overlapped with the first steel sheet, and a quenched nugget joining the first steel sheet and the second steel sheet together;
abutting a first electrode against the first steel sheet at a site A, which is a location at an outer side of the nugget in a sheet-plane direction in a plane running parallel to the first steel sheet of the welded joint;
abutting a second electrode against the second steel sheet at a site B, which is a location at an outer side of the nugget in a sheet-plane direction in a plane running parallel to the first steel sheet of the welded joint, and positioned on an opposite side of the nugget from the site A; and
passing a current through the welded joint between the first electrode and the second electrode.

A second aspect is the welded joint manufacturing method of the first aspect, wherein the site A and the site B are each separated from a center of the nugget in the plane running parallel to the first steel sheet by at least a maximum diameter of the nugget.

A third aspect is the welded joint manufacturing method of the second aspect, wherein a distance between the site A and the center of the nugget and a distance between the site B and the center of the nugget are equal to each other.

A fourth aspect is the welded joint manufacturing method of any one of the first aspect to the third aspect, further including:
abutting the first electrode against the first steel sheet such that the site A is interposed between the first electrode and a first fixing member provided on a second steel sheet side; and
abutting the second electrode against the second steel sheet such that the site B is interposed between the second electrode and a second fixing member provided on a first steel sheet side.

A fifth aspect is the welded joint manufacturing method of any one of claim 1 to claim 4, wherein:
any gap between the first steel sheet and the second steel sheet at a position of the site A is eliminated by interposing the site A between the first electrode and the first fixing member; and
any gap between the first steel sheet and the second steel sheet at a position of the site B is eliminated by interposing the site B between the second electrode and the second fixing member.

A sixth aspect is the welded joint manufacturing method of any one of the first aspect to the fifth aspect, wherein:
each of the first electrode and the second electrode has a constant width in the plane running parallel to the first steel sheet when the current is passed through the welded joint; and
the width of the first electrode and the width of the second electrode are at least a maximum diameter of the nugget in the plane running parallel to the first steel sheet.

A seventh aspect is the welded joint manufacturing method of any one of the first aspect to the sixth aspect, wherein when passing the current through the welded joint between the first electrode and the second electrode, an energization path is increased in length by passing the current through a region inside the welded joint other than the nugget.

An eighth aspect is a tempering device including:
a first electrode; and
a second electrode, wherein:
approach and retract directions of the first electrode and approach and retract directions of the second electrode are mutually opposing directions to each other; and
an inter-electrode distance between the first electrode and the second electrode is at least 6 mm in a flat plane orthogonal to the approach and retract directions.

A ninth aspect is the tempering device of the eighth aspect, further including:
a first fixing member provided coaxially with the approach and retract directions of the first electrode; and
a second fixing member provided coaxially with the approach and retract directions of the second electrode.

A tenth aspect is the tempering device of the ninth aspect, wherein:
the first fixing member is a third electrode;
the second fixing member is a fourth electrode; and
the tempering device further includes an energization controller configured to alternately execute energization between the first electrode and the second electrode and energization between the third electrode and the fourth electrode.

An eleventh aspect is a welding apparatus including:
the tempering device of any one of the eighth aspect to the tenth aspect;
a robot arm to which the tempering device is attached;
a welding machine configured to form a nugget; and
a position controller configured to control the robot arm so as to move an intermediate point between a tip of the first electrode and a tip of the second electrode to a location that has been welded as the nugget by the welding machine, and to dispose the first electrode and the second electrode at an outer side of the location that has been welded.

A twelfth aspect is a welded joint including:
a first steel sheet;
a second steel sheet overlapped with the first steel sheet; and
a quenched nugget joining the first steel sheet and the second steel sheet together; wherein:
tensile strength of the first steel sheet and the second steel sheet is at least 1180 MPa;
a contact mark from a first electrode is formed on the first steel sheet at a site A, which is a location at an outer side of the nugget in a sheet-plane direction in a plane running parallel to the first steel sheet of the welded joint;
a contact mark from a second electrode is formed on the second steel sheet at a site B, which is a location at an outer side of the nugget in a sheet-plane direction in a plane running parallel to the first steel sheet of the welded joint, and positioned on an opposite side of the nugget from the site A; and
a softened structure having Vickers hardness lower than Vickers hardness of the first steel sheet and Vickers hardness of the second steel sheet by at least 10 HV is continuously present between the contact mark from the first electrode and the contact mark from the second electrode.

Alternative Aspects

The present specification further conceptualizes the following alternative aspects.

Specifically, a first alternative aspect is a manufacturing method of a spot welded joint configured by plural steel sheets joined together by spot welding, the manufacturing method including:
a welding process of post-heating the plural mutually overlapped steel sheets to form a nugget;
a cooling process of cooling at least the nugget; and
a tempering process of post-heating the plural steel sheets in an oblique direction relative to a sheet thickness direction in order to temper at least the nugget.

A second alternative aspect is the spot welded joint manufacturing method of the first alternative aspect, wherein in the tempering process, an upper electrode and a lower electrode are disposed such that the plural steel sheets are interposed therebetween and also disposed at positions on mutually opposing sides of the nugget in a horizontal direction that is orthogonal to the sheet thickness direction, and the upper electrode and the lower electrode are employed to energize the plural steel sheets in the oblique direction.

A third alternative aspect is the spot welded joint manufacturing method of the second alternative aspect, wherein an inter-electrode distance between the upper electrode and the lower electrode in the horizontal direction is at least twice a diameter of the nugget.

A fourth alternative aspect is the spot welded joint manufacturing method of the second alternative aspect or the third alternative aspect, wherein a distance between the upper electrode and the nugget in the horizontal direction is equal to a distance between the lower electrode and the nugget in the horizontal direction.

A fifth alternative aspect is the spot welded joint manufacturing method of any of the second alternative aspect to the fourth alternative aspect, wherein in the tempering process, a fixing member is employed to fix the plural steel sheets during post heat.

A sixth alternative aspect is the spot welded joint manufacturing method of the fifth alternative aspect, wherein:
the fixing member includes an upper fixing member and a lower fixing member disposed such that the plural steel sheets are interposed therebetween; and
the upper fixing member is positioned on the opposite side of the nugget from the upper electrode in the horizontal direction; and
the lower fixing member is positioned on the opposite side of the nugget from the lower electrode in the horizontal direction.

The alternative aspects described above exhibit the following operation and advantageous effects.

In the spot welded joint manufacturing method according to the alternative aspects, the nugget is tempered by post-heating the plural steel sheets in the oblique direction with respect to the sheet thickness direction during the tempering process, this being a separate process to the welding process in which the nugget is formed. This approach is less liable to be affected by external factors, enabling excellent robustness to be secured.

The disclosure of Japanese Patent Application No. 2019-047020, filed on Mar. 14, 2019, is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A welded joint manufacturing method comprising:
preparing a welded joint including a first steel sheet, a second steel sheet overlapped with the first steel sheet, and a quenched nugget joining the first steel sheet and the second steel sheet together;
abutting a first electrode against the first steel sheet at a site A, which is a location at an outer side of the nugget in a sheet-plane direction in a plane running parallel to the first steel sheet of the welded joint, the site A being located separated from the nugget and not overlapping with the nugget in a sheet thickness direction;
abutting a second electrode against the second steel sheet at a site B, which is a location at an outer side of the nugget in a sheet-plane direction in a plane running parallel to the first steel sheet of the welded joint, and positioned on an opposite side of the nugget from the site A, the site B being located separated from the nugget and not overlapping with the nugget in the sheet thickness direction; and
passing a current through the welded joint between the first electrode and the second electrode.

2. The welded joint manufacturing method of claim 1, wherein the site A and the site B are each separated from a center of the nugget in the plane running parallel to the first steel sheet by at least a maximum diameter of the nugget.

3. The welded joint manufacturing method of claim 2, wherein a distance between the site A and the center of the nugget and a distance between the site B and the center of the nugget are equal to each other.

4. The welded joint manufacturing method of claim 1, further comprising:
abutting the first electrode against the first steel sheet such that the site A is interposed between the first electrode and a first fixing member provided on a side of the second steel sheet; and
abutting the second electrode against the second steel sheet such that the site B is interposed between the second electrode and a second fixing member provided on a side of the first steel sheet.

5. The welded joint manufacturing method of claim 4, wherein:
any gap between the first steel sheet and the second steel sheet at a position of the site A is eliminated by interposing the site A between the first electrode and the first fixing member; and
any gap between the first steel sheet and the second steel sheet at a position of the site B is eliminated by interposing the site B between the second electrode and the second fixing member.

6. The welded joint manufacturing method of claim 1, wherein:
each of the first electrode and the second electrode has a constant width in the plane running parallel to the first steel sheet when the current is passed through the welded joint; and
the width of the first electrode and the width of the second electrode are at least a maximum diameter of the nugget in the plane running parallel to the first steel sheet.

7. The welded joint manufacturing method of claim 1, wherein when passing the current through the welded joint between the first electrode and the second electrode, an energization path is increased in length by passing the current through a region inside the welded joint other than the nugget.

8. A tempering device comprising:
a first electrode; and
a second electrode, wherein:
approach and retract directions of the first electrode and approach and retract directions of the second electrode are mutually opposing directions to each other;
the first electrode and the second electrode are disposed separated from each other without overlapping in the approach and retract directions; and
an inter-electrode distance between the first electrode and the second electrode is at least 6 mm in a flat plane orthogonal to the approach and retract directions.

9. The tempering device of claim 8, further comprising:
a first fixing member provided coaxially with the approach and retract directions of the first electrode; and
a second fixing member provided coaxially with the approach and retract directions of the second electrode.

10. The tempering device of claim 9, wherein:
the first fixing member is a third electrode;
the second fixing member is a fourth electrode; and
the tempering device further comprises an energization controller configured to alternately execute energization between the first electrode and the second electrode and energization between the third electrode and the fourth electrode.

11. A welding apparatus comprising:
the tempering device of claim 8;
a robot arm to which the tempering device is attached;
a welding machine configured to form a nugget; and
a position controller configured to control the robot arm so as to move an intermediate point between a tip of the first electrode and a tip of the second electrode to a location that has been welded as the nugget by the welding machine, and to dispose the first electrode and the second electrode at an outer side of the location that has been welded.

12. A welded joint comprising:
a first steel sheet;
a second steel sheet overlapped with the first steel sheet; and
a quenched nugget joining the first steel sheet and the second steel sheet together;
wherein:
tensile strength of the first steel sheet and the second steel sheet is at least 1180 MPa;
a contact mark from a first electrode is formed on the first steel sheet at a site A, which is a location at an outer side of the nugget in a sheet-plane direction in a plane running parallel to the first steel sheet of the welded joint;
a contact mark from a second electrode is formed on the second steel sheet at a site B, which is a location at an outer side of the nugget in a sheet-plane direction in a plane running parallel to the first steel sheet of the welded joint, and positioned on an opposite side of the nugget from the site A; and
a softened structure having Vickers hardness lower than Vickers hardness of the first steel sheet and Vickers hardness of the second steel sheet by at least 10 HV is continuously present between the contact mark from the first electrode and the contact mark from the second electrode.

* * * * *